US008639699B2

(12) United States Patent
Andrasick et al.

(10) Patent No.: US 8,639,699 B2
(45) Date of Patent: Jan. 28, 2014

(54) SYSTEM, APPARATUS AND METHOD FOR GENERATING ARRANGEMENTS OF DATA BASED ON SIMILARITY FOR CATALOGING AND ANALYTICS

(75) Inventors: Christopher Jordan Andrasick, Montara, CA (US); Anthony Scott Askew, San Francisco, CA (US)

(73) Assignee: Tacit Knowledge, Inc., San Francisco, CA (US)

( * ) Notice: Subject to any disclaimer, the term of this patent is extended or adjusted under 35 U.S.C. 154(b) by 0 days.

(21) Appl. No.: 13/314,158

(22) Filed: Dec. 7, 2011

(65) Prior Publication Data

US 2013/0151481 A1 Jun. 13, 2013

(51) Int. Cl.
*G06F 17/30* (2006.01)
(52) U.S. Cl.
USPC ........ 707/740; 707/104.1; 707/723; 707/959; 711/206; 715/825
(58) Field of Classification Search
CPC ...................................... G06F 17/30
USPC ............... 707/104.1, 723, 959, 999.003, 740; 711/206; 715/825
See application file for complete search history.

(56) References Cited

U.S. PATENT DOCUMENTS

| 6,728,706 | B2 | 4/2004 | Aggarwal et al. |
|---|---|---|---|
| 7,366,721 | B1 | 4/2008 | Bennett et al. |
| 7,958,116 | B2 | 6/2011 | House et al. |
| 2005/0144158 | A1 | 6/2005 | Capper et al. |
| 2006/0101017 | A1 | 5/2006 | Eder |
| 2008/0098025 | A1 | 4/2008 | Vadlamani et al. |
| 2008/0109327 | A1* | 5/2008 | Mayle et al. ..................... 705/27 |
| 2008/0120292 | A1 | 5/2008 | Sundaresan et al. |
| 2008/0212899 | A1 | 9/2008 | Gokturk et al. |
| 2010/0082634 | A1* | 4/2010 | Leban ........................... 707/741 |
| 2010/0138414 | A1 | 6/2010 | Newman et al. |

OTHER PUBLICATIONS

Luna, Allison "Guided Product Search: How Product Attributes Help Online Retailers Increase Sales" Apr. 1, 2007 Retrieved from the Internet: <URL: http://www.channelintelligence.com/resources/Documents/CIWhitePaper_ProductAttributes_May2007.pdf> entire document.

* cited by examiner

*Primary Examiner* — Dennis Truong
(74) *Attorney, Agent, or Firm* — Kokka & Backus, PC

(57) ABSTRACT

Embodiments of the invention relate generally to electrical and electronic hardware, computer software, wired and wireless network communications, and computing devices, and more particularly, to a system, an apparatus and a method configured to generate arrangements of data, including data catalogs, to facilitate discovery of items via an interface depicting item representations based on similarity of one or more attributes. In one embodiment, a method includes receiving data representing a request to transmit data; executing instructions at a processor to determine the relationships of the item representations to the principal item representation for records stored in a memory, associating the item representations to positions of a data arrangement based on the relationships of the item representations. Also the method can include transmitting to a computing device data representing the data arrangement including data representing the item representations to be presented on an interface of the computing device.

24 Claims, 24 Drawing Sheets

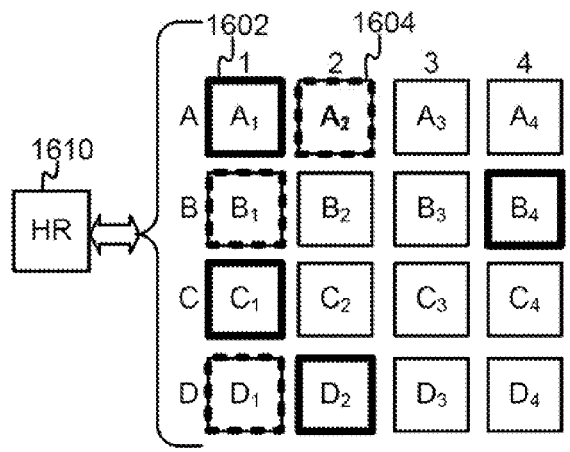
FIG. 16A
FIG. 16B
FIG. 16C
FIG. 16D
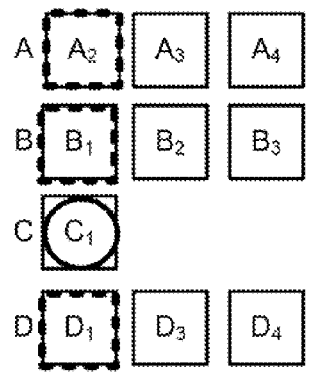
FIG. 16E
FIG. 16F

SYSTEM, APPARATUS AND METHOD FOR GENERATING ARRANGEMENTS OF DATA BASED ON SIMILARITY FOR CATALOGING AND ANALYTICS

CROSS REFERENCE TO RELATED APPLICATIONS

This application is related to U.S. Nonprovisional application Ser. No. 13/314,153, filed concurrently, all of which is hereby incorporated by reference for all purposes.

BRIEF DESCRIPTION OF THE INVENTION

Embodiments of the invention relate generally to electrical and electronic hardware, computer software, wired and wireless network communications, and computing devices, and more particularly, to a system, an apparatus and a method configured to generate arrangements of data, including data catalogs, to facilitate discovery of items via an interface, such as a touchscreen interface, depicting item representations based on similarity of one or more attributes.

BACKGROUND OF THE INVENTION

Traditional techniques for providing searching capabilities, such as for web-based searching, have been developed principally to serve users having work station-like computing devices and monitors, including desktop computing devices, laptop computing devices, and the like. These computing devices have sufficient resources, such as display area of a monitor or a liquid crystal display ("LCD") flat panel, to convey information to facilitate searching of a collection of data entities in a database. In ecommerce applications, for instance, search processes typically are established to facilitate searching via the above-identified computing devices for products in catalog databases, and traditional arrangements of data and data relationships. While functional, there is a variety of drawbacks associated with the conventional approaches to searching for data entities.

FIG. 1A illustrates a conventional data arrangement for supporting traditional approaches to searching databases. Data are arranged in a hierarchical data structure 101 having various levels of data relationships (e.g., levels of parent-child relationships), including level ("1") 103*a*, level ("2") 103*b*, and level ("3") 103*c*. In tree-like data structure 101, a catalog is arranged in various nested levels of categories, each of which terminates in a set of data files for a set of products. A conventional approach to search for products organized in accordance with hierarchical data structure 101 requires a user to repeatedly select categories in which to drill down into until a set of product data files is discoverable. If the user has not discovered a desired product, the user is required usually to return to a higher-level of hierarchy to reiterate drilling down through other branches of the data structure 101 in search of the desired product.

FIG. 1B illustrates an interface 100 used to generate or transition among a series of windows typically used in traditional search techniques, including on-line or web-based searching. Generally, as a user causes typical search algorithms to move up and down levels of tree-like data structure 101, the changes between levels 103*a*, 103*b*, and 103*c* invoke generation of (or transition to) a window, or portion thereof (e.g., an HTML iframe). In a typical catalog search process, a window 102 is shown to a user in response to a request (not shown) to search a catalog of footwear data files. Window 102 includes a representation, such as link ("Next") 104, which can be a link associated with a category that is selectable. Window 102 transitions to window 112 when the user selects link 104. The user then is presented in this illustration with window ("Popular footwear") 112 from which additional categories can be selected in accordance with data structures of a conventional web-based catalog system 115 to facilitate on-line searches of product catalogs. Window 112 includes a depiction of a representation 113 of a first type of shoe. Consider that the user has a moderate amount of interest in the first type of shoe. But in accordance with conventional search techniques, a user might experience a transition back to window 102 if the user desires to review information regarding the higher-level information regarding footwear that is associated with window 112. Such transitions disrupt the user's experience and search process. Further, the user might experience a delay before being able to proceed to the next step of the search process, which typically resumes with transition from either window 102 or 112, by selecting a category associated with either link 104 or link 106. Again, the user traditionally experiences another transition to window ("Men's Footwear") 122 to search through a more specific set of product files. Yet again, a user encounters further disruptions and delays when the interface transitions to another window 132 (e.g., upon selection of a category associated with link 108), should, for example, the user desires to review information regarding men's dress shoes. Window 132 includes a depiction of a representation 133 of a second type of shoe. At this point in the search, the user might have an interest in the second type of shoe, but typically must rely on the recollection of the first type of shoe when comparing and contrasting products to select between the two shoe types for making a purchase. Transitioning back to a window that contains information about the first type of shoe might be difficult for the user to do based on the user's recollection and usually takes additional time.

The back-and-forth nature of conventional search processes usually requires that the user interact with two or more windows 102, 112, 122, and 132, which interrupts the user experience during searching. Users also experience numerous visual transitions, disruptions and delays in the process of searching a conventional product catalog. It is also expected that, after each stage, some users decide not to continue with the relatively cumbersome search process, resulting in the loss of potential customers or customers and less favorable conversions.

In view of the foregoing, it is be desirable to provide an apparatus, a system, and a method for overcoming the drawbacks of the conventional deposition processes to search data structures for a record of interest.

SUMMARY OF THE INVENTION

Embodiments of the invention relate generally to electrical and electronic hardware, computer software, wired and wireless network communications, and computing devices, and more particularly, to a system, an apparatus and a method configured to generate arrangements of data, including data catalogs, to facilitate discovery of items via an interface, such as a touchscreen interface, depicting item representations based on similarity of one or more attributes.

BRIEF DESCRIPTION OF THE FIGURES

The invention is more fully appreciated in connection with the following detailed description taken in conjunction with the accompanying drawings, in which:

FIGS. 16A to 16F depict an example of a sequence of using one or more matrices of similarity values to resolve duplicates or redundancies, according to some embodiments;

Like reference numerals refer to corresponding parts throughout the several views of the drawings. Note that most of the reference numerals include one or two left-most digits that generally identify the figure that first introduces that reference number.

DETAILED DESCRIPTION

Figure 2A:
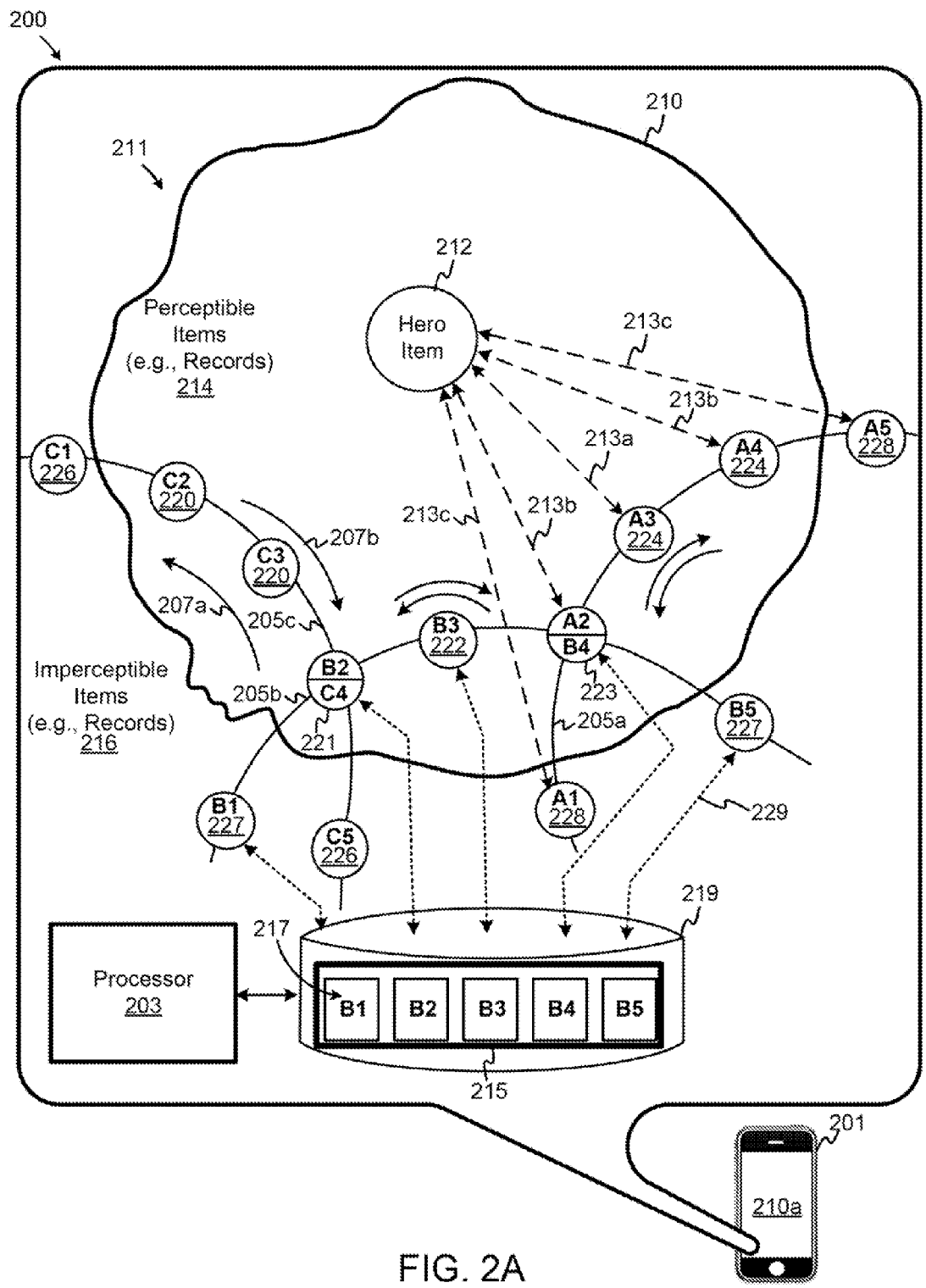
FIG. 2A depicts an example of an apparatus operating in accordance various methods for searching a collection of data records represented by items in an interface, according to some embodiments.

FIG. 2A depicts an example of an apparatus operating in accordance various methods for searching a collection of data records represented by items in an interface, according to some embodiments. Diagram 200 depicts an example of a computing device, such as mobile device 201, including one or more processors ("processor") 203 coupled to a storage, such as memory 219, and configured to execute instructions to determine relationships of data records for presentation as items in an interface 211. An example of interface 211 is interface 210a of mobile device 201. Processor 203 can use and/or generate a data structure 215 that includes records 217 and data associated with items subject to discovery via techniques and interfaces described herein. According to some embodiments, processor 203 can be configured to identify sets of records associated with one or more attributes of items store as data in data structure 215. For example, processor 203 can identify a first set of items corresponding to an attribute "C." This set includes item ("C1") 226, item ("C2") 220, item ("C3") 220, item ("C4") 221, and item ("C5") 226. Processor 203 also can identify a second set of items corresponding to an attribute "B," which includes item ("B1") 227, item ("B2") 221; item ("B3") 222, item ("B4") 223, and item ("B5") 227. Further, a third set of items corresponding to an attribute "A" can include item ("A1") 228, item ("A2") 223, item ("A3") 224, item ("A4") 224, and item ("A5") 228. According to some embodiments, the term "item" can refer to an object or a subject of a search and can be any entity, either tangible or intangible, whereas the term "record" can refer to data representing an item. In some cases, relationships between records can be used to arrange the records (or portions of data thereof) in sets, such as ordered sets. As used herein, the terms "item" and "record" can be used interchangeably and/or in accordance with the context in which the terms are described. To illustrate, associations 229 can exist between records 217 and representations of items 221, 222, 223, and 227. A "representation" of an item or record can be image, icon, text, or any graphic or other perceptible features (including audio, etc.) that can be displayed in (or otherwise perceived in relation to) an interface. A representation can include an association between a perceived item (e.g., on an interface) and a record. For example, a representation can be a link (e.g., an URL) or the like, that can be perceptible (or otherwise).

Figure 1A:
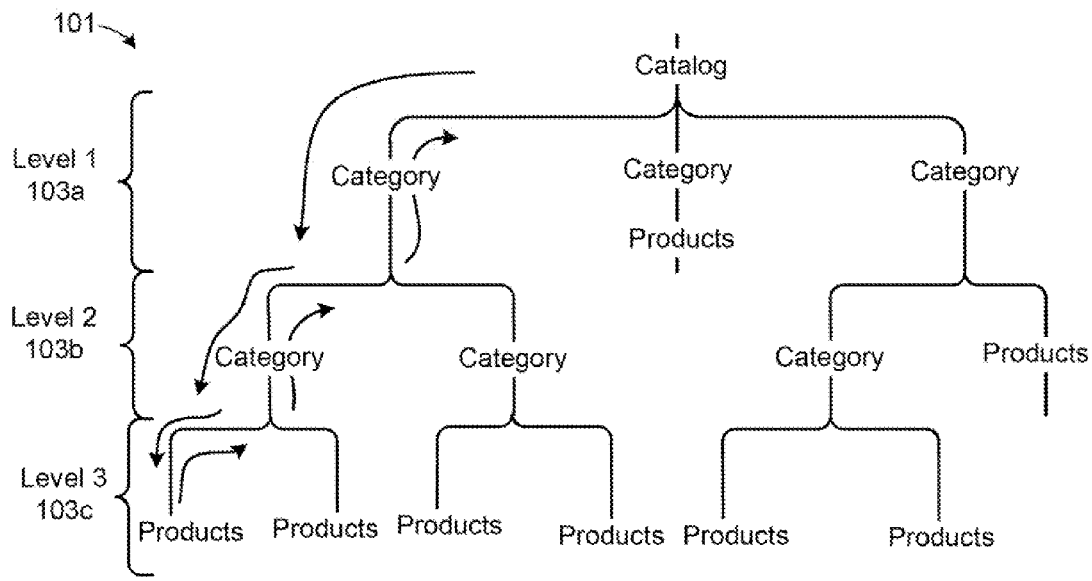
FIG. 1A illustrates a conventional data arrangement for supporting traditional approaches to searching databases.
Figure 1B:
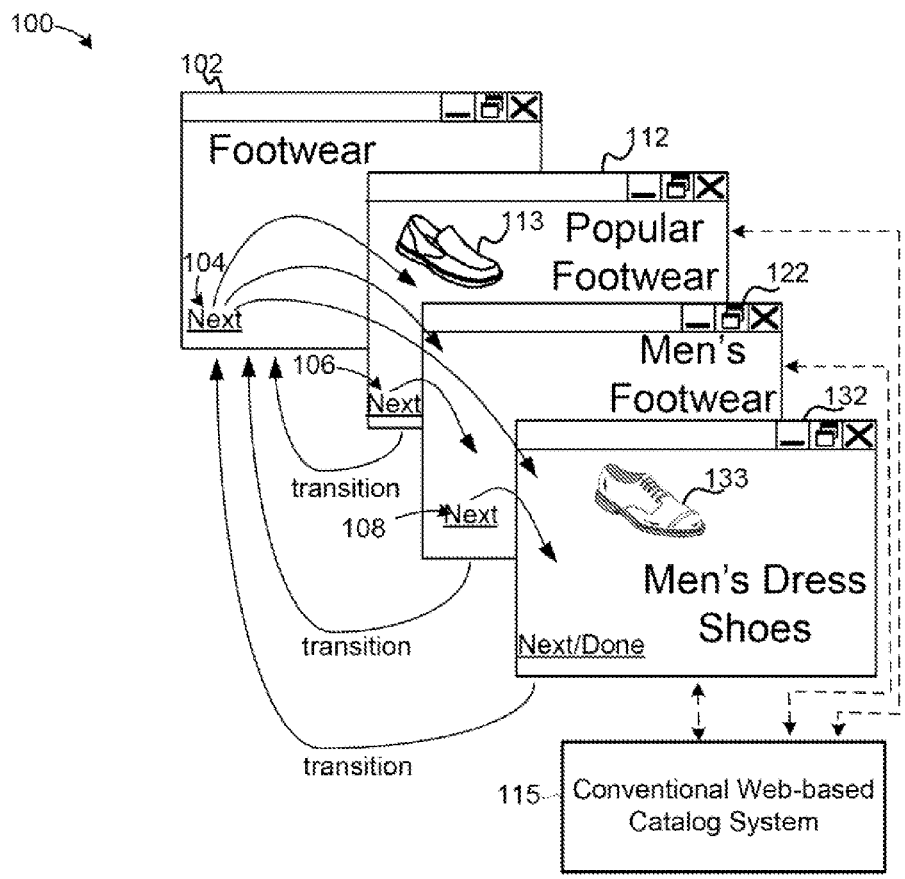
FIG. 1B illustrates an interface used to generate or transition among a series of windows typically used in traditional search techniques, including on-line or web-based searching.

According to some embodiments, processor 203 can either establish or identify sets of items associated with the records, one or more sets being associated with one or more attributes and one or more records being disposed relative to other records in a corresponding set. Note that a position of a record relative to another record need not be physical, but rather can be conceptually described as such with data representing the relative degree to which one record is related to another. In some examples, a record is arranged, physically and/or conceptually, relative to other records based on similarity to a record associated with hero item 212. For example, a record for item 224 is disposed at its position in the corresponding a similarity value describing its similarity to a record for hero item 212. The similarity value can be influenced, in whole or in part, by a distance 213a between one or more attributes of item 224 and hero item 212. Similarly, records for items 223 and 224 can be disposed at their respective positions based on distances 213b that describe their similarity to a record for hero item 212. As shown, records for items 228 are least similar to the record for hero item 212, based on the distances 213c between one or more attributes of items 228 and hero item 212. Note that similarity values and techniques of presenting representations of items on an interface need not require varying physical lengths, as depicted by the double-headed lines representing distances 213a, 213b, and 213c. Rather, the physical lengths of the representations of distances 213a, 213b, and 213c in FIG. 1 are instructive to demonstrate a relative difference in attribute distances.

Data representing records for items 212, 220, 221, 222, 223, 224, 226, 227, and 228, and data representing similarity values, which influence the relative position or relationship of one item among other the items, can be used to determine which items (or representations thereof) ought to be identified as a perceptible item 214 for presentation in interface 211. Also, data representing similarity values can be used to determine which items (or representations thereof) ought to be identified as an imperceptible item 216. In the example shown, processor 203 determines representations of items 220 and 221 are to be presented in interface 211, based on similarity values, for records associated with a variable attribute "C," whereas representations for items 226 and are not presented in interface 211. According to some embodiments, representations for items 220, 221, and 226 are selectable (e.g., via an interaction with interface 211) by the use of a mouse, cursor, or by other any other selection mechanism, including detection of physical engagement of interface 211. For example, a user can activate one or more actions or cause one or more events by touching interface 211 (i.e., a representation of an item) and performing a physical act, such as a gesture (e.g. using a finger to engage a representation of an item and swiping the finger in a direction to cause or urge displacement). Further to the example shown, a representation for item 220 can be selected and displaced in a direction 207b or 207a along path 205c. Displacement of the representation of item 220 in direction 207b by one item causes the representation of item 221 to be displaced externally to boundary 210 and becomes an imperceptible item, whereas the representation of item 226 is displaced internally to boundary 210 and becomes a perceptible item. Similarly, representations of items 221, 222, 223, 224, 227 and 228 can be displaced similarly along paths 205b and 205a.

In view of the foregoing, structures and/and functions of various apparatuses and methods can serve to facilitate discovery of items by presenting subsets of representations of items based on similarity to an item of interest, such as a hero item, whereby a subset of item representations includes a variable attribute. As a subset of representations of items, such as those associated with attribute "C," is displaced relative to boundary 210, other subsets of representations of items, such as those associated with attributes "A" and "B," are maintained within boundary 210. Further, the hero item 212 remains within boundary 210. Therefore, a user can search for an item of interest incrementally by, for example, varying a specific attribute relative to hero item 212. Thus, attribute adjacency is retained for attributes other than the variable attribute. In particular, other attributes (other than the variable attribute) and their attribute distances (and/or similarities) relative to hero item 212, remain relatively unchanged or vary by little/negligible amounts. Therefore, a user can select an attribute to vary while concurrently viewing a representation of hero item 212, thereby obviating requirements to transition to or generate other windows (or portions thereof) that otherwise might obscure intermediate search results. According to some embodiments, the presentation of representations for hero item 212 and other items can be optimized to provide enhanced searching and discovery capabilities. For example, mobile devices 201 generally have relatively smaller viewable surfaces (e.g., 3.5 inches in the diagonal) as compared to monitors and screens of laptops and workstations. As such, structures and/and functions of the various embodiments can facilitate and enhance, for example, the mobility of searching product catalogs, and, thus, facilitate ecommerce. In particular, mobile device 201 can include near field communication capabilities for making payment for purchasing a product, the discovery of which can be expedited by the structures and/and functions of the various embodiments.

In operation, processor 203 can receive data indicating a selection of a subset of selectable item representations in a region of interface 211, responsive to a first type of event associated with a portion of the interface. An example of the first type of event can be a physical engagement of, or interaction with, interface 211 (or the detection thereof) of a region associated with the subset, including, but not limited to, one of the selectable representations, such as representation for item ("C3") 220. Also, processor can receive data specifying a perceptible displacement of the representation of item ("C3") 220 in the subset, responsive to a second event with interface 211, with which to introduce a next subset of selectable item representations into a region within boundary 210. An example of the second type of event can be a physical action or interaction with interface 211 (or the detection thereof) to cause displacement of the subset of item representations, including, but not limited to, swiping a finger across a surface of interface 211 or any other gesture implying motion.

A third type of event detectable by processor 203 includes receiving data indicating a selection of any item representation in interface 211 to form a selected item, whereby processor 203 initiates replacement of hero item representation 212 with a selected item representation, such as the representation for item ("A3") 224. Subsequent to the selection of the new hero item (and associated hero record), one or more of the representations of the items in the sets can be replaced. Similarity values between various items and the new hero item are determined (e.g., recalculated), and representations of items having record attributes that are most similar to the new hero item/record are disposed in interface 211 to facilitate further discovery. Paths 205a-205c can be linear or curvilinear, and/or can be predetermined or determined arbitrarily as a user navigates the representations of the items and over the sets of records. Note that representations of items 221 and 223 are disposed at intersections of subsets of selectable item representations. While records associated with items 220, 222, 224, 226, 227, and 228 vary by an attribute, the records associated with items 221 and 223 are each associated with two subsets of item representations, and, thus, vary by at least two attributes. The disposition of selectable item representations at intersections is optional and is not required in some embodiments, and, thus, paths 205a-205c need not intersect. As used herein, at least in some cases, the term "processor" can refer to either hardware, including programmable logic and central processing units, or software, including virtual processors or processing engines, or can be a combination of both hardware and software. As used herein, at least in some cases, the term "similarity" can refer to how closely two items (e.g., two products) or groups of items resemble each another, or how closely a value of an attribute for one item is relative to a value of an attribute for another item. Similarity can refer to how closely one or more values of one or more attributes for one item is relative to one or more values of one or more attributes for another item. Similarity can also refer to a difference between values of an attribute for two items, the difference being referred to as an "attribute distance," at least in some embodiments. An attribute distance can also represent an average or an aggregated value of multiple values for multiple attributes, and can be normalized. A "similarity value" can be referred to a normalized attribute distance, and can have values ranging from 0 to 1. Similarity values closer to 0 represent similar attributes or records, whereas similarity values closer to 1 represent more dissimilar attributes or records. In some embodiments, similarity and similarity values can be expressed mathematically (e.g., additively). As used herein, the term "hero" refers to an item or record of interest (e.g., of principal interest) against which other items or records are matched to determine whether those other items or records are similar in some respects (e.g., some attributes), but different in others (e.g., other attributes). According to various embodiments, examples of, interface 211 include physical interfaces (e.g., a telephone or a display on the telephone) and virtual interfaces (e.g., a web page, panel, window, display, palette, tab, screen, or the like).

Figure 2B:
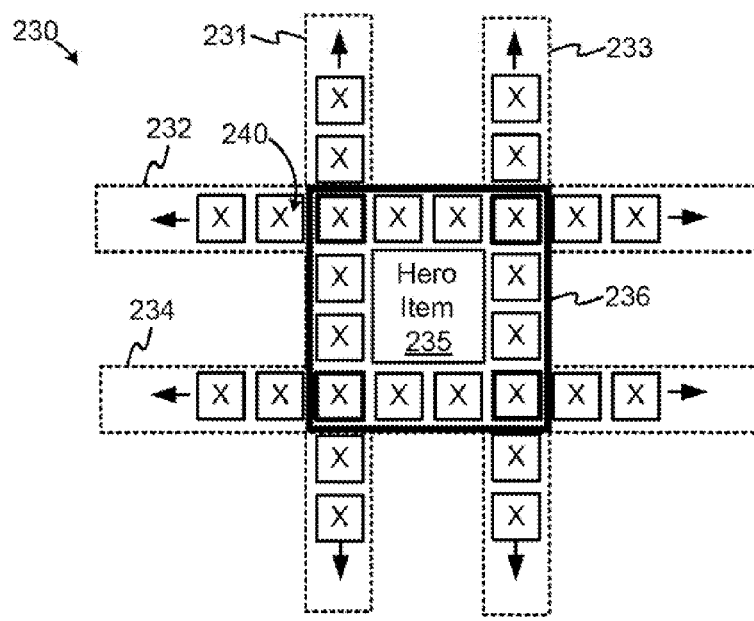
FIGS. 2B-2D depict examples of arrangements of item representations, according to various embodiments.
Figure 2C:
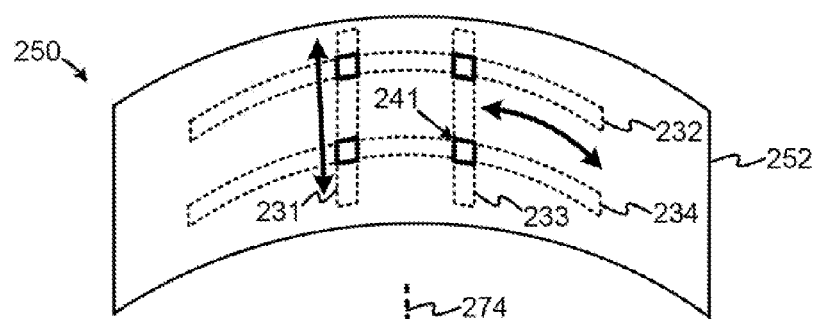
Figure 2D:
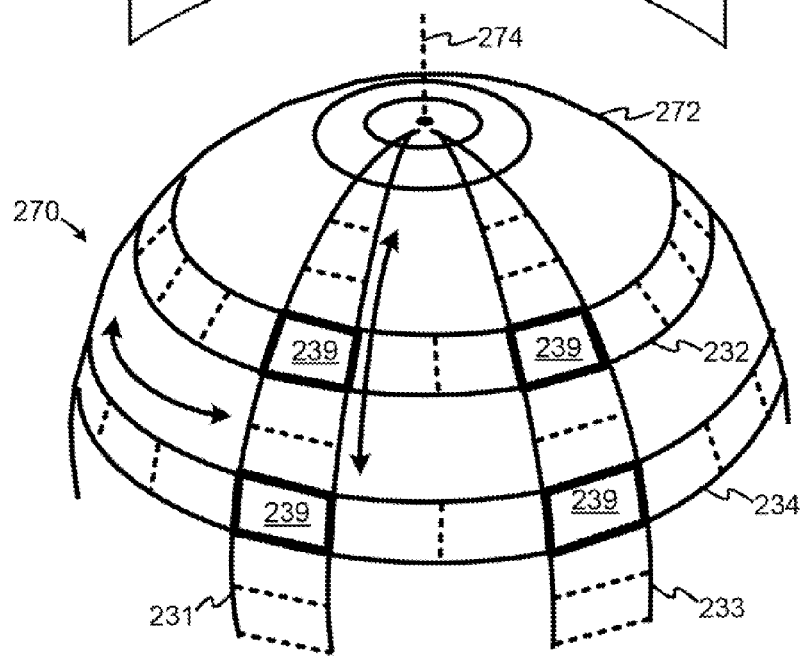

FIGS. 2B-2D depict examples of arrangements of item representations, according to various embodiments. Diagram 230 of FIG. 2B depicts an example of a planar implementation of an arrangement of item representations 240 including four sets of item representations 240, such as sets 231, 233, 232 and 234. Each of sets 231, 233, 232 and 234 are associated with a variable attribute. That is, a specific attribute varies in the corresponding set of item representations 240 (and associated records), but the specific attribute that varies in one set is different than other sets, at least in some cases. A variable attribute of one item representation varies in relation to the variable attribute of another item of the same set. For example, color as a variable attribute can vary from one item to the next in a set. Item representations 240 that are within boundary 236 of an interface are associated with records having similarity values that fall within a range of similarity values indicative of being the most similar to a similarity value for a record for hero item 235. Item representations 240 that are without boundary 236 have similarity values indicative of being less similar to hero item 235. Diagram 250 of FIG. 2C depicts an example of an arrangement of four sets of item representations, such as sets 231, 233, 232 and 234, that is coextensive with spherical surface 272. In particular, one or more of sets 231, 233, 232 and 234 can be coextensive with a surface 252 that is non-planar. Item representations 241 are disposed at the intersections of sets 231, 233, 232 and 234. Diagram 270 of FIG. 2D depicts an example of an arrangement of four sets of item representations, such as sets 231, 233, 232 and 234, that is coextensive with spherical surface 272 oriented relative to, and optionally rotatable about, axis 274. Item representations 239 are disposed at the intersections of sets 231, 233, 232 and 234. Note that the above-described arrangements of item representations are illustrative and are not intended to be limiting. Thus, there can be more or fewer than four sets 231, 233, 232 and 234. The arrangements of item representations need not be limited to touchscreen interfaces, but rather, can be implemented in space (e.g., 3D space) in which a user's movement relative to, or engagement with, a point in three dimensional space can be sufficient to implement the techniques described herein.

Figure 3A:
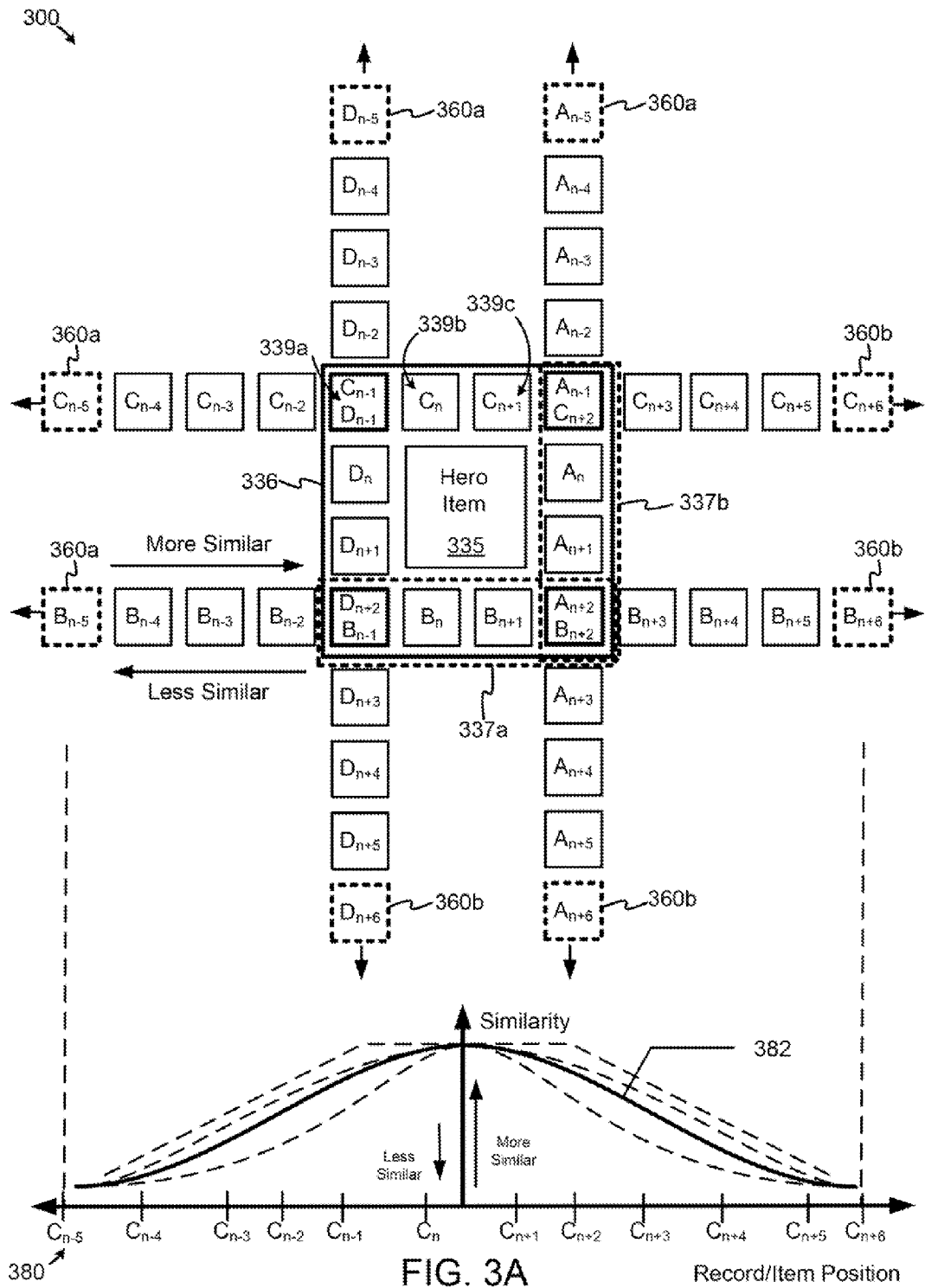
FIG. 3A is an example of an arrangement of item representations for presentation in a user interface, according to various embodiments.

FIG. 3A is an example of an arrangement of item representations for presentation in a user interface, according to various embodiments. Similar to diagram 230 of FIG. 2B, the arrangement of item representations include four sets of item representations. A first set associated with an attribute "A," including item representations ranging from item representation (and/or associated record) $A_{n-5}$ to item representation $A_{n+6}$. The other three sets are associated with attributes "B," "C," and "D." Items, such as products, represented by item representations in the four sets can constitute sorted records that establish four ordered sets based on similarity to a specific item of interest (e.g., the hero item). A set can be displaced along an axis relative to boundary 336.

While many more records and item representations can be implemented other than that is shown, for purposes of illustration, consider that FIG. 3A depicts the universe of records and item representations. In this case, records 360a are first terminus records and records 360b are second terminus records, all of which are least similar to hero item representation 335, at least initially. By contrast, records associated with item representations disposed within interface boundary 336, which is a visible portion of an interface, are most similar to a record for hero item representation 335. And records adjacent boundary 336, but external thereto, are more similar to the record for hero item representation 335 than records 360a and 360b. Relationship 380 depicts an example of the relative degree of similarity 382 for items (or records) for a set (subset) disposed in interface 336, which is relatively higher than for those items (or records) positioned external to interface 336. Note that degree of similarity 382 can vary from one item to the next for a set, the variations depicted in dashed lines. As illustrated in this example, the more "similar" an item (or record) is to a principal item of interest (e.g., item representation for $C_n$), the greater the magnitude of "similarity" (i.e., more similar) as is shown, whereas the less similar an item is to the principal item of interest (e.g., item representation for $C_{n-4}$), the lower the magnitude (i.e., less similar) of "similarity." Note that in some embodiments, similarity can be represented by a "similarity value" ranging, for example, from 0 to 1, whereas values near 0 represent "more similar" items and values near 1 represent "less similar" items.

Further to FIG. 3A, the four sets of item representations at portions of the interface at which an intersection item representation 339a is disposed. In the example shown, intersection item representation 339a belongs to both a row and a column that overlap it. Note that record $A_{n-1}$ (and also $C_{n+2}$) is associated with an item that is most similar to hero item representation 335 without considering attributes "A" and "C." For example, record $A_{n-1}$ can be associated with or have attributes "A," "B," "C," and "D." To determine its similarity value, the attribute values of attributes "A" and "C" are ignored and the similarity value of record $A_{n-1}$ (relative to hero item representation 335) is based on attributes "B" and "D." In some embodiments, regions 337a and 337b are disposed or related to adjacent portions of boundary 336 and peripheral portions of a principal item, including hero item 335. Note that while hero item 335 is shown to be centrally located within boundary 336, there is no intention that hero item 335 is limited to such a location. Rather, hero item 335 and the portion of the interface in which it is associated can be disposed anywhere within boundary 336. The intersections of regions, such as regions 337a and 337b, include an intersection item representation 339a for a record designated as both $A_{n+2}$ and $B_{n+2}$ as it is a member of two sets of item representations. In some embodiments, item representations in a region can constitute a subset of item representations. The subsets of item representations in boundary 336 include interstitial item representations, which are disposed adjacent to one of intersection item representations 339a. Here, interstitial item representations 339b and 339c are disposed between two intersection item representations 339a. Note that records $C_n$ and $C_{n+1}$ are interstitial item representations 339b and 339c associated with items that are most similar to hero item representation 335 without considering attribute "C." For example, record $C_n$ can be associated with or have attributes "A," "B," "C," and "D." To determine a similarity value for either interstitial item representation 339b or 339c, the attribute value of attribute "C" is ignored and the similarity value of records $C_n$ or $C_{n+1}$ (relative to hero item representation 335) is based on attributes "A," "B," and "D." There may be more or fewer sets of item representations than is shown in other embodiments.

Figure 3B:
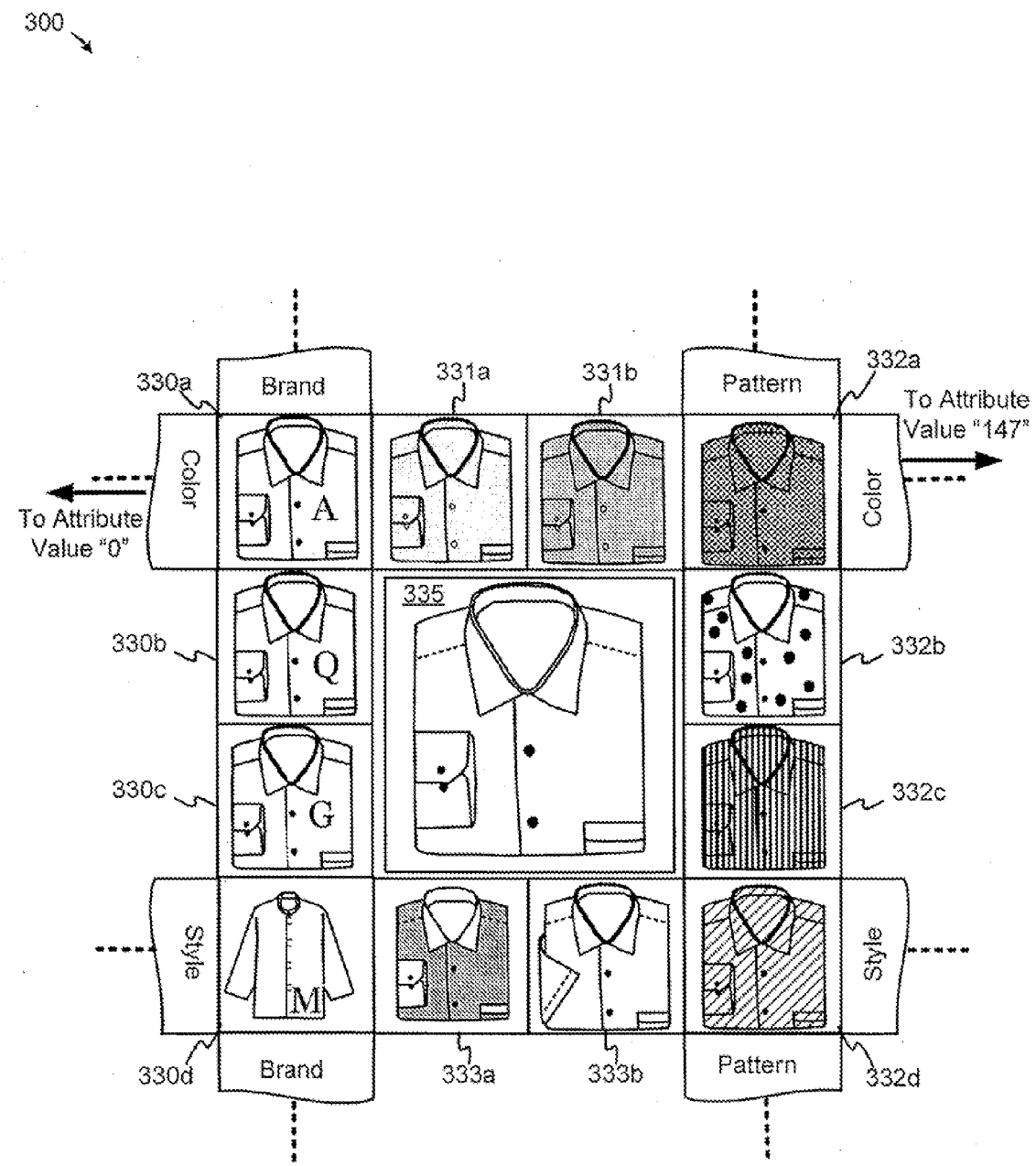
FIG. 3B is an example of an arrangement of item representations for presentation in a user interface to search through data representing a collections of shirts, according to various embodiments.

FIG. 3B is an example of an arrangement of item representations for presentation in a user interface to search through data representing a collections of shirts, according to various embodiments. In view of FIG. 3A, sets of items associated with attributes "A," "B," "C," and "D" are now associated, respectively, with attributes "Pattern," "Style," "Color," and "Brand." There may be more or fewer attributes that describe them, including price, size, availability, and the like. In this example, the differences between the four product attributes are that the four depicted sets define products that are to be displayed in the arrangement of item representations. Here, the arrangement of item representations includes two rows and two columns. The hero item representation 335 is depicted as a shirt of interest, and is like the shirts in the row above it with the exception of color. That is, the color attribute is not used to determine which shirts should be displayed in the top row. Therefore, a user interested in other aspects of hero item representation 335 (e.g., similar aspects of pattern, style, and/or brand), can search through the top row to find a similar shirt in a different color. In some embodiments, the subsets of item representations that are visible or accessible in the interface (and their corresponding sets) can be ordered sets. For example, one terminus record located to the left (not shown) can correspond to an HTML color value and the other terminus record located to the right (not shown) can correspond to another HTML color value. As another example, the color attribute can vary from light to dark from one terminus record to the other. The user can interact with a user interface to slide a row or column of shirts to view more variations. Specific to the example shown, item representations 330a to 332 represent a variety of colors, item representations 332a to 332d represent a variety of patterns, item representations 332d to 330d represent a variety of styles, and item representations 330d to 330a represent a variety of brands.

Figure 4A:
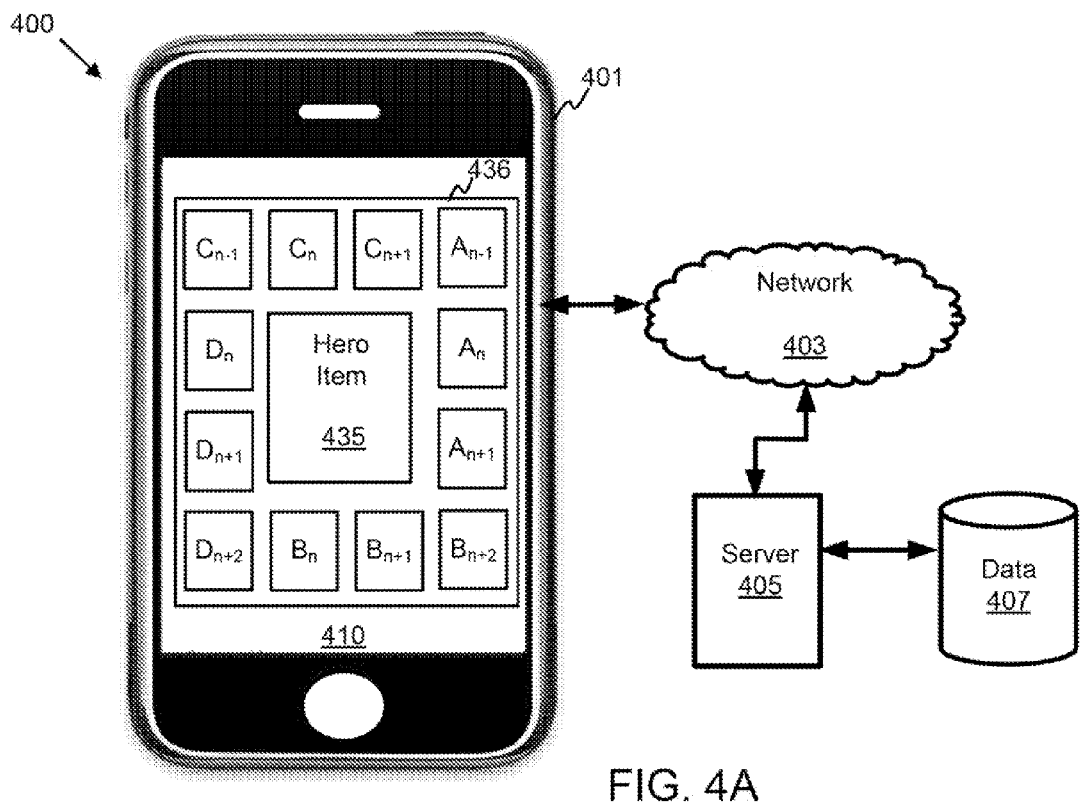
FIG. 4A depicts an example of a device including a touch-screen configured to facilitate searching via an arrangement of item representations in accordance with at least some embodiments.

FIG. 4A depicts an example of a device including a touchscreen configured to facilitate searching via an arrangement of item representations in accordance with at least some embodiments. Device 401 includes logic configured to present an arrangement 436 of item representations and a hero item representation 435 in a touchscreen interface 410. In some embodiments, device 401 is configured to exchange data via network 403 with either server 405, to access logic, or repository ("data") 407 to access data. According to various embodiments, server 405 can provide logic to generate sets of item representations and can calculate similarity values for records stored in repository 407. Further, any logic, structure and/or function described herein, or variants thereof, can be disposed either in device 401 or in the combination of server 405 and repository 407, or distributed in both.

Figure 4B:
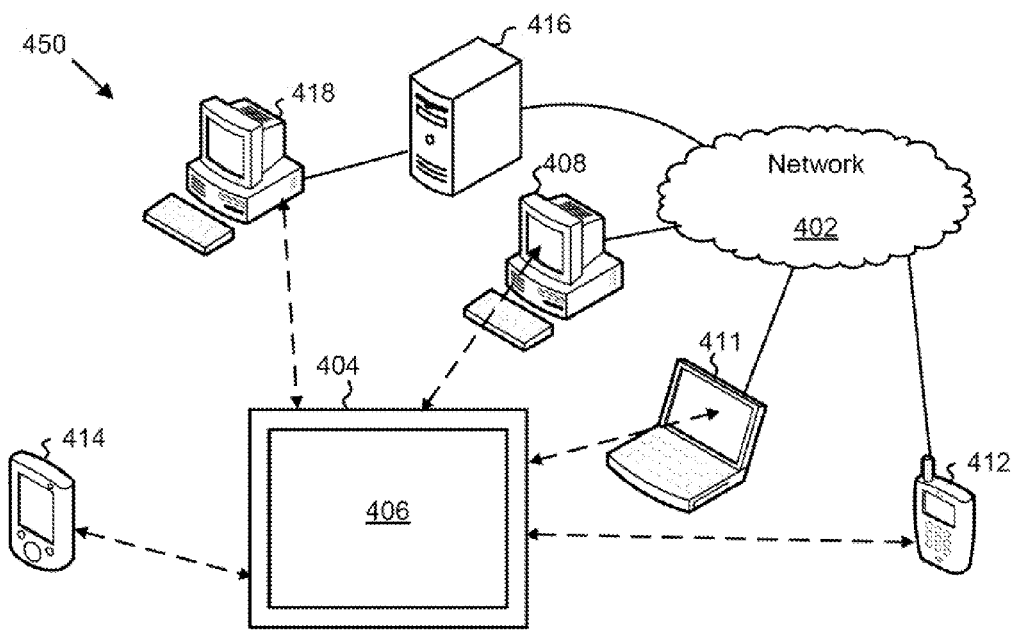
FIG. 4B illustrates an example of an interface for implementing various techniques describe herein, according to various embodiment of the invention.

FIG. 4B illustrates an example of an interface for implementing various techniques describe herein, according to various embodiment of the invention. Here, computing device 400 is coupled to a network 402, a display environment 404, an interface 406, which can be presented on devices such as computer 408, notebook computer ("notebook" or "laptop") 411, mobile or smart phone 412, personal digital assistant ("PDA") or tablet 414, server 416, and administrator computer 418. In other examples, the number and type of devices can be varied and are not limited to those shown and described. In some examples, one or more panels for implementing an arrangement of item representations can be presented on interface 406, which can be an interface for an application, or as a web browsing program, Internet content portal, client or desktop application for any purpose. In one embodiment, interface 406 can include any number and/or any type of display environments, such as CRT and LCD displays. Note that the above-described system and elements can be varied and are not limited to the descriptions or examples provided.

Figure 5:
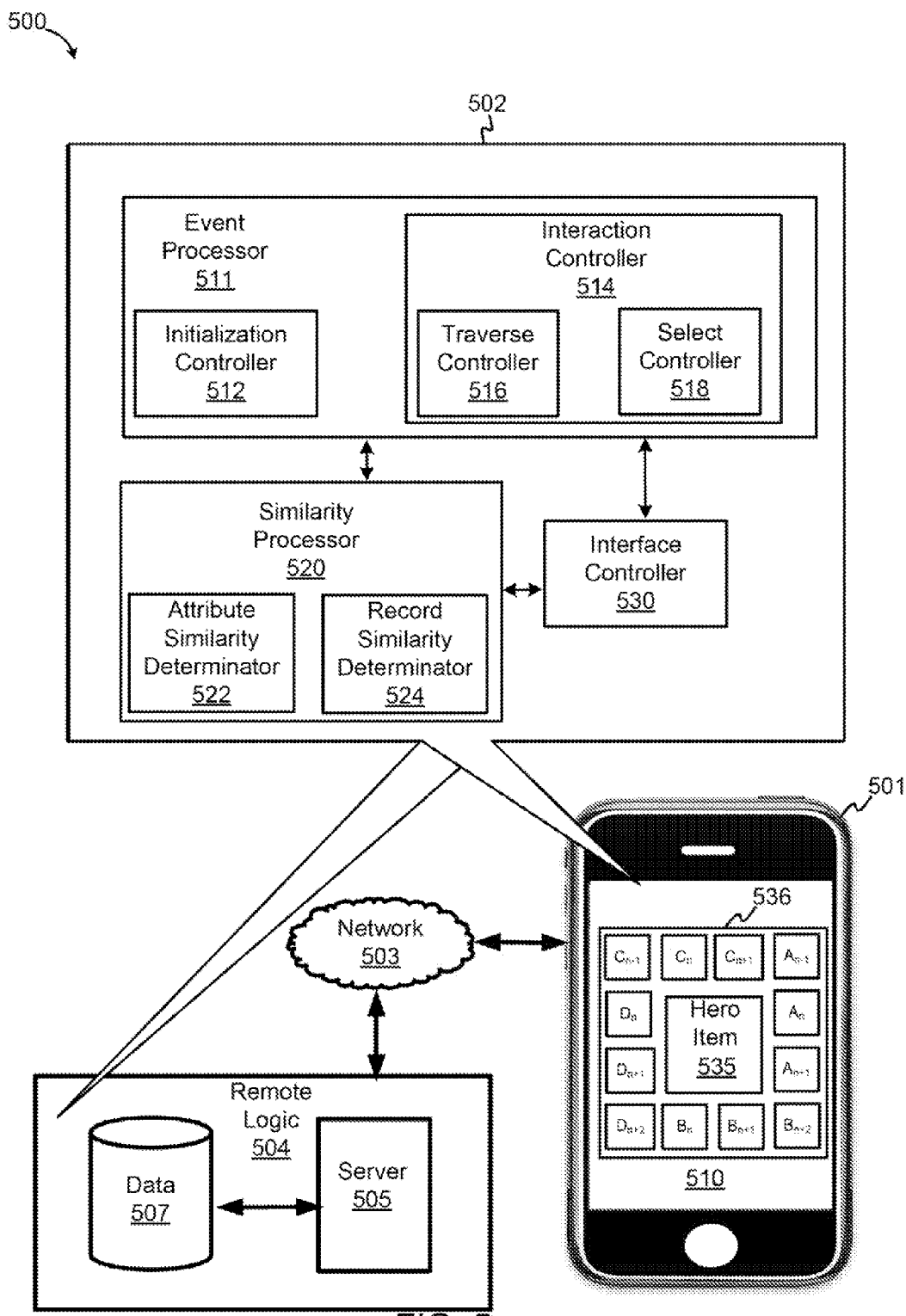
FIG. 5 depicts separable and/or combinational portions of logic configured to facilitate generation and/or presentation of an arrangement of item representation, according to various embodiments.

FIG. 5 depicts separable and/or combinational portions of logic configured to facilitate generation and/or presentation of an arrangement of item representation, according to various embodiments. Diagram 500 includes a mobile device 501 including a touchscreen interface 510 in which an arrangement 536 of item representations and a hero item representation 535 is disposed therein. Diagram 500 also includes remote logic 504 coupled via network 503 to mobile device 501, remote logic 504 including a server 505 and a repository 507. Logic 502 is depicted as separable and/or combinational portions of logic that can be distributed in any manner over mobile device 501, remote logic 504, and any other computing resource (not shown). Logic 502 can be implemented in software, hardware, firmware, circuitry, or a combination thereof. Note that the structures and constituent elements shown, as well as their functionality, can be aggregated with one or more other structures or elements, or distributed throughout.

In the example shown, logic 502 includes an event processor 511, a similarity processor 520, and an interface controller 530. Event processor 511 includes an initialization controller 512 and interaction controller 514, which, in turn, includes a traverse controller 516 and a select controller 518. Among other things, initialization controller 512 can be configured to facilitate an item discovery process, for example, by controlling the initialization of hero item representations 510 and arrangement 536 of item representations. Initialization controller 512 is configured to identity an item of interest, such as a hero item, with which similarity values can be relative to other items. In some embodiments, initialization controller 512 disposes a predetermined hero item within a specific portion of interface 510 upon an initial search. A merchant, for example, can determine the initial hero item, or analytic logic can be configured to monitor and summarize user behavior in relation to sets of records for purposes determining the initial hero item. In other cases, in response to the selection of an item representation can cause initialization controller 512 to select the item representation as the new or updated hero item. Subsequently, initialization controller 512 controls initialization or reinitialization of one or more item representations based on the new hero item. In some embodiments, initialization controller 512 can present subsets of selectable item representations in regions of touchscreen interface 510 between portions of a boundary and peripheral portions of a principal region in which hero item is disposed, based on similarity to the new hero item.

Traverse controller 516 is configured to control, for example, at least some functionalities of interaction controller 514, which controls other aspects of interactions between an interface and data representing arrangements of item representations. Traverse controller 516 can be configured to receive data indicating a selection, for example, of any portion of a region of the interface that includes a subset of the selectable item representations, responsive to a first event with the interface. For purposes of navigating through the item representations during a search, the selection can include an item representation. Further, traverse controller 516 can be configured to receive data specifying a displacement of a selectable item representation, responsive to a second event with the interface. An example of a first event includes detection of a physical engagement of the interface, and an example of a second event includes detection of physical displacement of the engagement of the interface, thereby resulting in a "flick" operation. In some embodiments, these events can relate to an event associated with flicking item representations in a row or column. Traverse controller 516 is configured further to generate signals to cause displacement of the selectable item representation in the region. For example, the signals can be applied to interface controller 530, which is configured regenerate the graphical and implement or facilitate the functional features of the interface.

Select controller 518 is configured to determine a selection of an item representation for purpose of replacing the hero item representation 510. Further, select controller 518 is configured to identify the selected item representation to initialization controller 512 for purposes of reinitializing the arrangement of item representations based on attributes of the new hero item.

Similarity processor 520 is configured to use similarity values or to generate similarity values, or both, and similarity processor 520 includes an attribute similarity determinator 522 and a record similarity determinator 524. Attribute similarity determinator 522 is configured to determine similarity between individual attributes shared by a hero item record ("HR") and a sample record ("SR"). In some embodiments, attribute similarity determinator 522 is configured to calculate the similarity between an attribute of the hero record and the sample record by first, for example, calculating a distance (i.e., delta) between the attribute values of HR and SR in an attribute set. Next, the distance can be normalized by dividing the distance by the total number of values in the set (i.e., the size of the set). Note that in some cases, either hero or sample records, or both, can have multiple values of the same attribute. In these cases, attribute similarity determinator 522 is configured to determine similarity by calculating minimum distances between an attribute value for a sample record and for the hero record. Then, attribute similarity determinator 522 is configured to divide the previous result by the total attribute values in the set (e.g., the size of the set). In some embodiments, the term "attribute distance" can refer to the distance or the normalized distance between attribute values.

Record similarity determinator 524 is configured to determine a similarity value based on the combination of one or more attribute similarity values generated by attribute similarity determinator 522. In some embodiments, some attributes are determined to be more important than others. Accordingly, similarity determinator 524 is configured to apply weighting factors to the attribute similarity values of various attributes for a sample record. The weighting factors can amplify or dampen attribute similarity values relative to one another to produce an optimized result.

Figure 6:
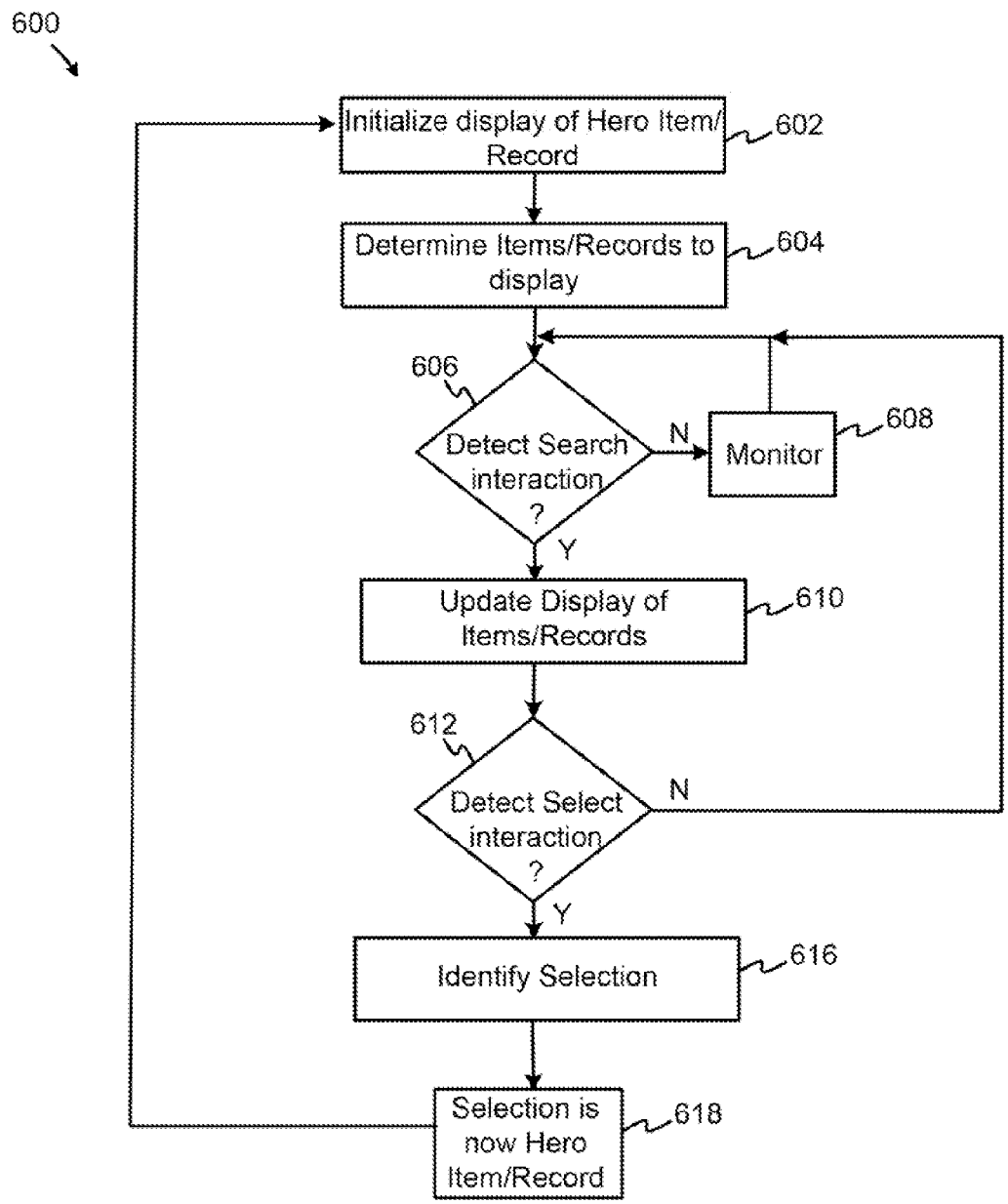
FIG. 6 is an example of a flow depicting a process by which an event processor operates, according to an embodiment.

FIG. 6 is an example of a flow depicting a process by which an event processor operates, according to an embodiment. In flow 600, an interface is initialized to include a hero item representation for a hero record at 602, and a determination is made at 604 which item representations (other than the hero item) is to be displayed in the interface. In some embodiments, initialization controller 512 can perform 602 and 604. At 606, a determination is made whether a search-related interaction is detected. If not, flow 600 moves to 608 to monitor interactions with the interface. Otherwise, flow 600 moves to 610 at which a next subset of item representations are presented in the interface responsive to, for example, a "flick" interaction or gesture detected at 606. In some embodiments, traverse controller 516 can perform 606 and 610. At 612, a determination is made whether a select-related interaction is detected. If not, flow 600 moves to 606. Otherwise, flow 600 moves to 612 at which the selected item representation is identified responsive to, for example, a "double tap" interaction or gesture a user cause a finger to tap twice at the surface of an interface adjacent to the desired item to be selected). In some embodiments, select controller 518 can perform 612 and 616. Next, the selected item representation becomes the new hero item representation at 618.

Figure 7:
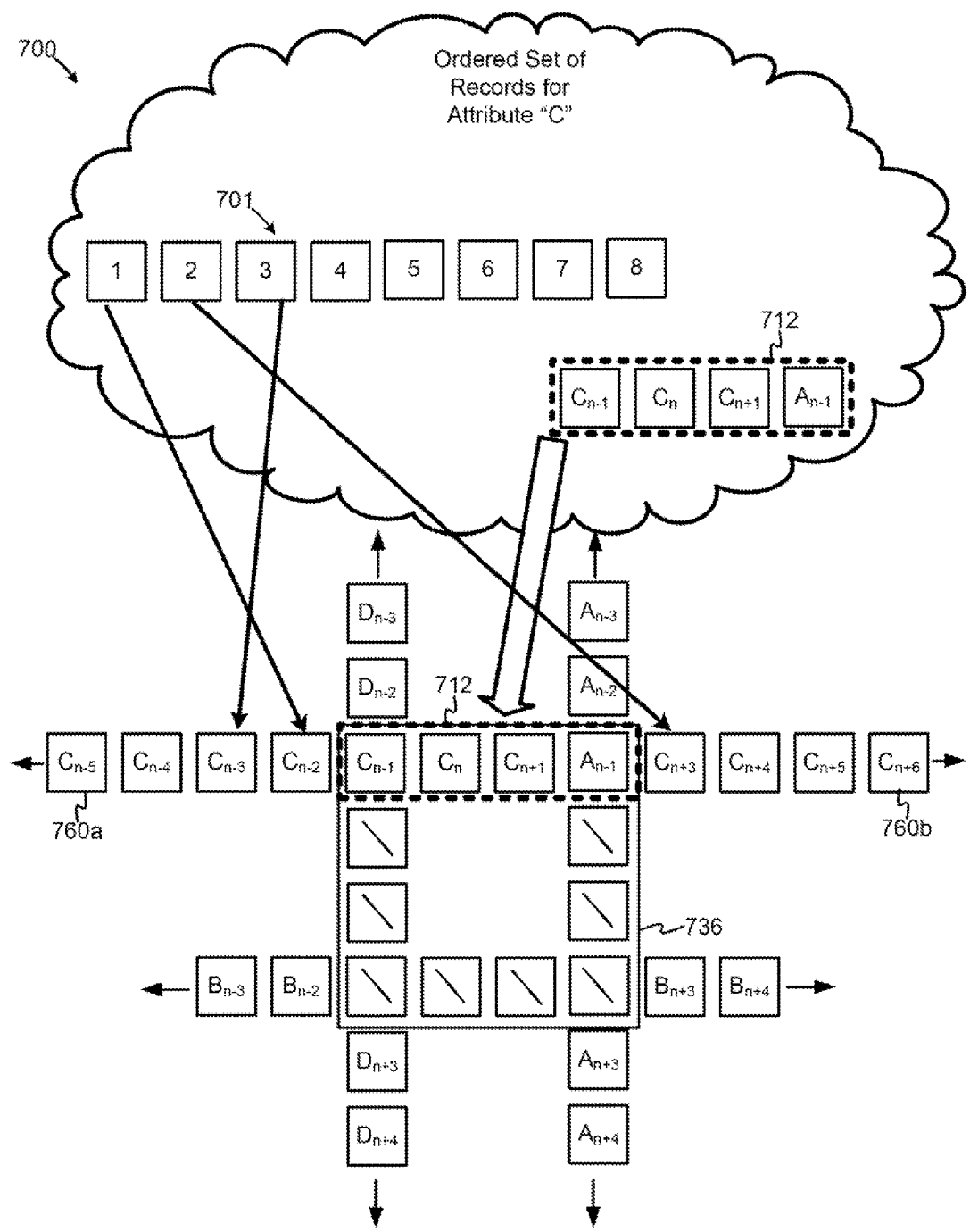
FIG. 7 depicts an example of the generation of an ordered set for presentation in relation to an interface, according to some embodiments.

FIG. 7 depicts an example of the generation of an ordered set for presentation in relation to an interface, according to some embodiments. Diagram 700 depicts an arrangement of item representations yet to be populated, and the population of slots to include item representations (or data representing associations between item representations and records). The slots can include positions of data or records for corresponding interface portions having an order of introduction into or out of interface boundary 736. Middle records 712 are disposed within interface boundary 736, and thus represent the most similar records to a hero record. Record slots into which item representations are to populate extend from terminus records 760a and 760b, which include the least similar records. Ordered set 701 is generated with the generation of other ordered sets or sequences. Logic is configured to create a mapping from ordered set 701 to positions or slots in which the records are disposed. For example, records number 2 and 3 of ordered set 701 are disposed respectively in an arrangement of item representations as records Cn−2 and Cn+3. According to some embodiments, ordered sets, such as ordered set 701, are disposed in the arrangement of item representations after interface includes item representations at intersections and in interstitial positions or slots.

Figure 8A:
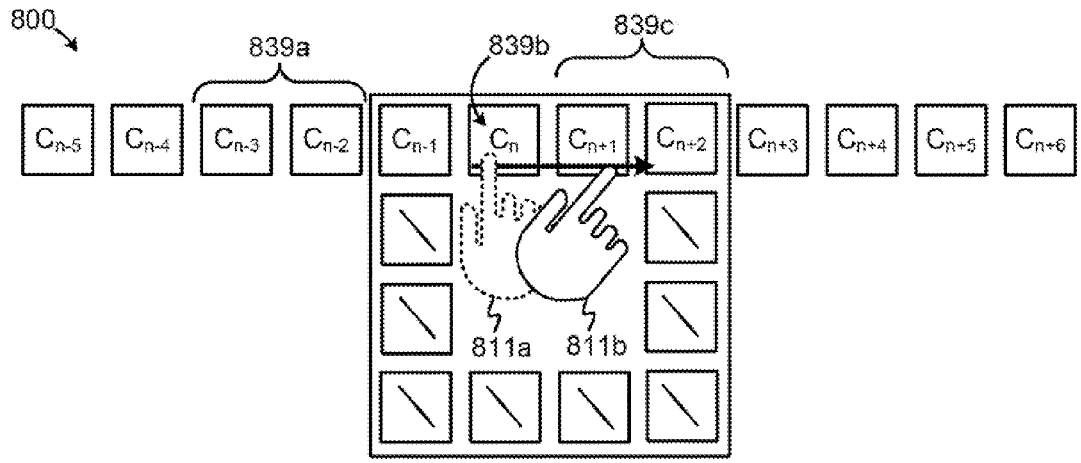
FIGS. 8A and 8B depict an example interaction with an interface, according to some embodiments.
Figure 8B:
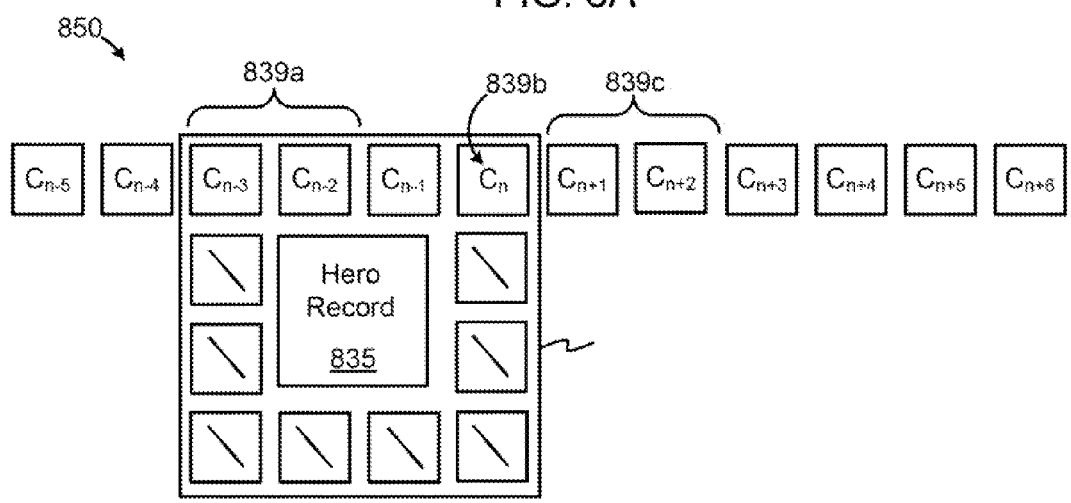

FIGS. 8A and 8B depict an example interaction with an interface, according to some embodiments. Diagram 800 depicts engagement of an item representation for purposes of displacing the item representation. For example, a user 811a can engage item representation 839b and can displace or otherwise urge item representation 839b by two record widths (as displayed) as user 811b moves (e.g., a finger tip) or otherwise traverses over the interface. Diagram 850 depicts the result of the displacement, whereby records and/or associated items 839c become imperceptible in FIG. 8B and records and/or associated items 839a become perceptible.

Figure 9A:
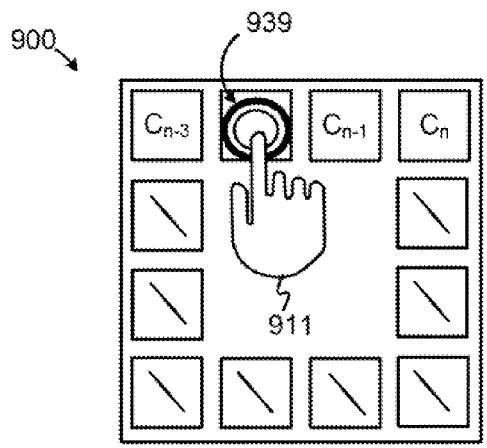
FIGS. 9A and 9B depict another example interaction with an interface, according to some embodiments.
Figure 9B:
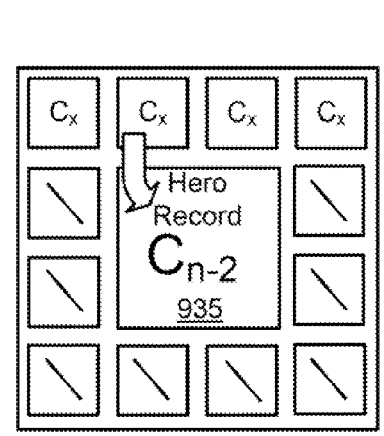

FIGS. 9A and 9B depict another example interaction with an interface, according to some embodiments. Diagram 900 depicts engagement of an item representation for purposes of selecting the item representation as the new hero item. For example, a user 911 can engage item representation 939 and can interact with the interface (e.g., by double tapping a finger) to select item representation 939. Diagram 950 depicts the result of the selection, whereby record and/or associated item 939 becomes a hero item representation 935 in FIG. 9B.

Figure 10:
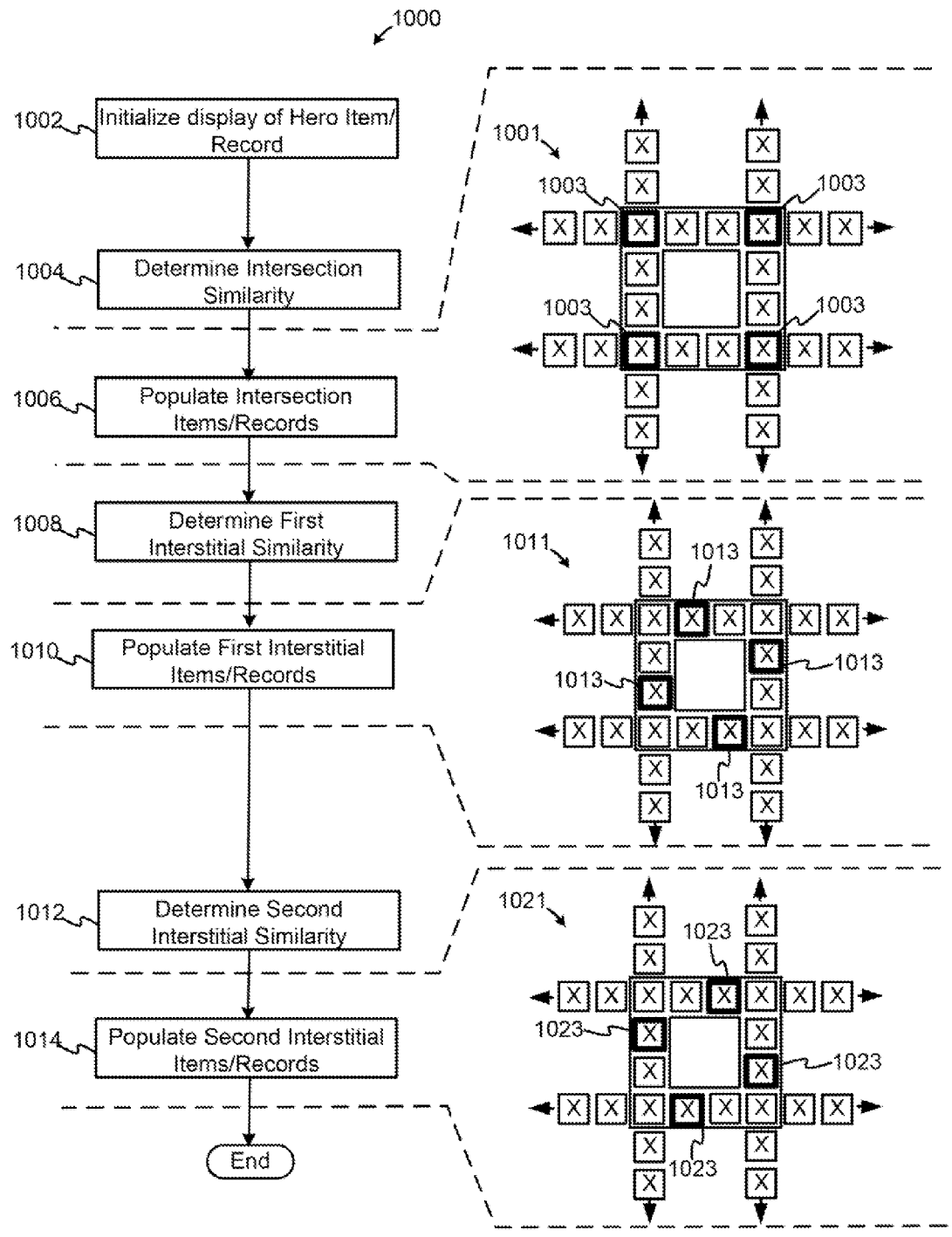
FIG. 10 is a diagram depicting a flow of populating an arrangement of item representations upon initialization, according to some embodiments.

FIG. 10 is a diagram depicting a flow of populating an arrangement of item representations upon initialization, according to some embodiments. Flow 1000 initializes a presentation of a hero item representation at 1002. At 1004, flow 1000 performs intersection similarity to determine intersection records having a first set of similarity values indicated of the most similar records to the hero record when ignore multiple attributes. In some examples, records to populate intersections 1003 of diagram 1001 are determined by generating sets of records for each intersection based on similarities between sample records in which multiple attributes are ignored (e.g., attributes relating to both a row and a column for a specific intersection). The records to be disposed at the intersections are removed from further consideration when those intersection records are populated at 1006. At 1008, flow 1000 determines a first level of interstitial similarity in a manner similar to intersection similarity determinations at 1004. Similarity determinations of interstitial records, however, ignore an attribute associated with the set of records. Four records are determined in flow 1000 and used to populate at 1010 first interstitial positions 1013 of diagram 1011. The four records are removed. At 1008, flow 1000 determines a second level of interstitial similarity in a manner similar to interstitial similarity determinations at 1008. Four records are determined in flow 1000 and used to populate at 1014 second interstitial positions 1023 of diagram 1021. The four records are removed.

Figure 11:
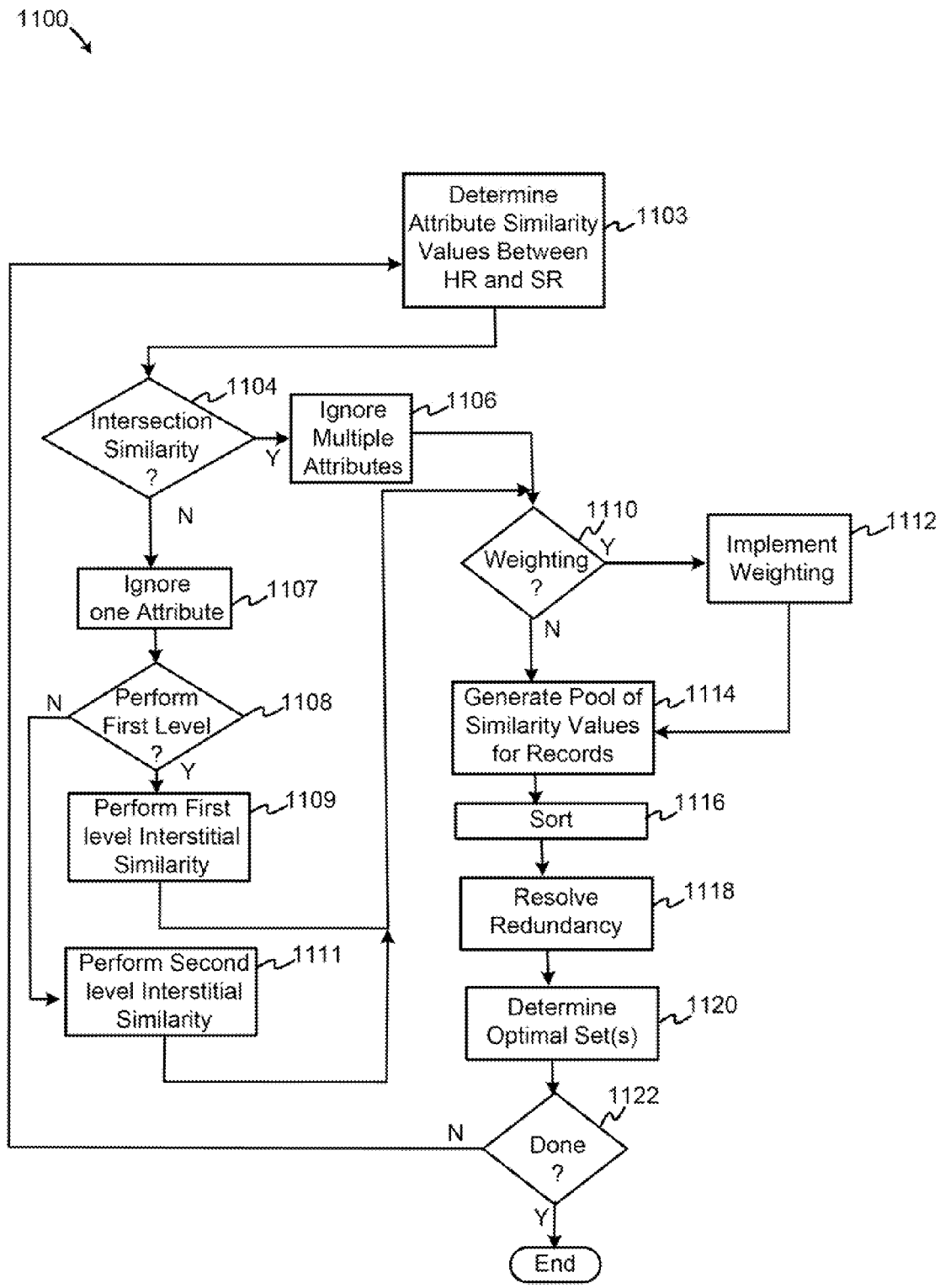
FIG. 11 is a diagram depicting a flow of determining intersection similarity and interstitial similarity for populating items for associated records in an interface, according to one embodiment.

FIG. 11 is a diagram depicting a flow of determining intersection similarity and interstitial similarity for populating items for associated records in an interface, according to one embodiment. At 1103, flow 1100 determines similar values between attributes of pairings of a hero record and a source record, thereby creating a number of attribute similarity values, or $SIM_{ATTR}$. According to one embodiment, attribute similarity values are determined as described in FIGS. 12 and 13. Referring back to FIG. 11, flow at 1104 determines whether intersection similarity has been performed. If not, flow 1100 moves to 1106 at which multiple attributes will be ignored in determining record similarity values. A determination is made whether to include weighting factors at 1110, and if so, flow 1100 moves to 1112 to pass weighting coefficients. At 1114, a pool of sample records are determined with corresponding record similarity values. In some embodiments, a record similarity value can be determined as follows:

$$SIM_{SR} = \frac{\sum (C_{ATTR} SIM_{ATTR})}{\sum C_{ATTR}} \quad \text{Equation 1}$$

As such, a record similarity value, $SIM_{SR}$, between a sample record and a hero record is the sum of weighted attribute similarity values, $SIM_{ATTR}$, for the shared attributes (except either the two omitted attributes for intersection similarities or the one omitted attribute for interstitial similarities). Thus, at 1114 a pool of record similarity values, $SIM_{SR}$, are determined. At 1116, the records are sorted to form ordered sets. At 1118, redundant or duplicate records are removed, such as described in FIGS. 16A to 16F. At 1120, an optimal set for the intersection (e.g., four records) are determined. Flow 1110 continues back to 1103 to use or generate, if necessary, attribute similarity values, $SIM_{ATTR}$. At 1104, it is determined that intersection similarity has been performed and flow 1110 proceeds to 1107 at which an attribute is ignored. If it is determined at 1108 that flow 1100 has yet to perform first level interstitial similarity, then flow 1100 continues to 1109 to perform first level interstitial similarity as described above, except there are four less records and one attributed is ignored. Flow 1100 repeats again when it is determined that flow 1100 is to perform second level interstitial similarity at 1111. Flow 1100 terminates when records for the interface are populated as determined at 1122.

Figure 12:
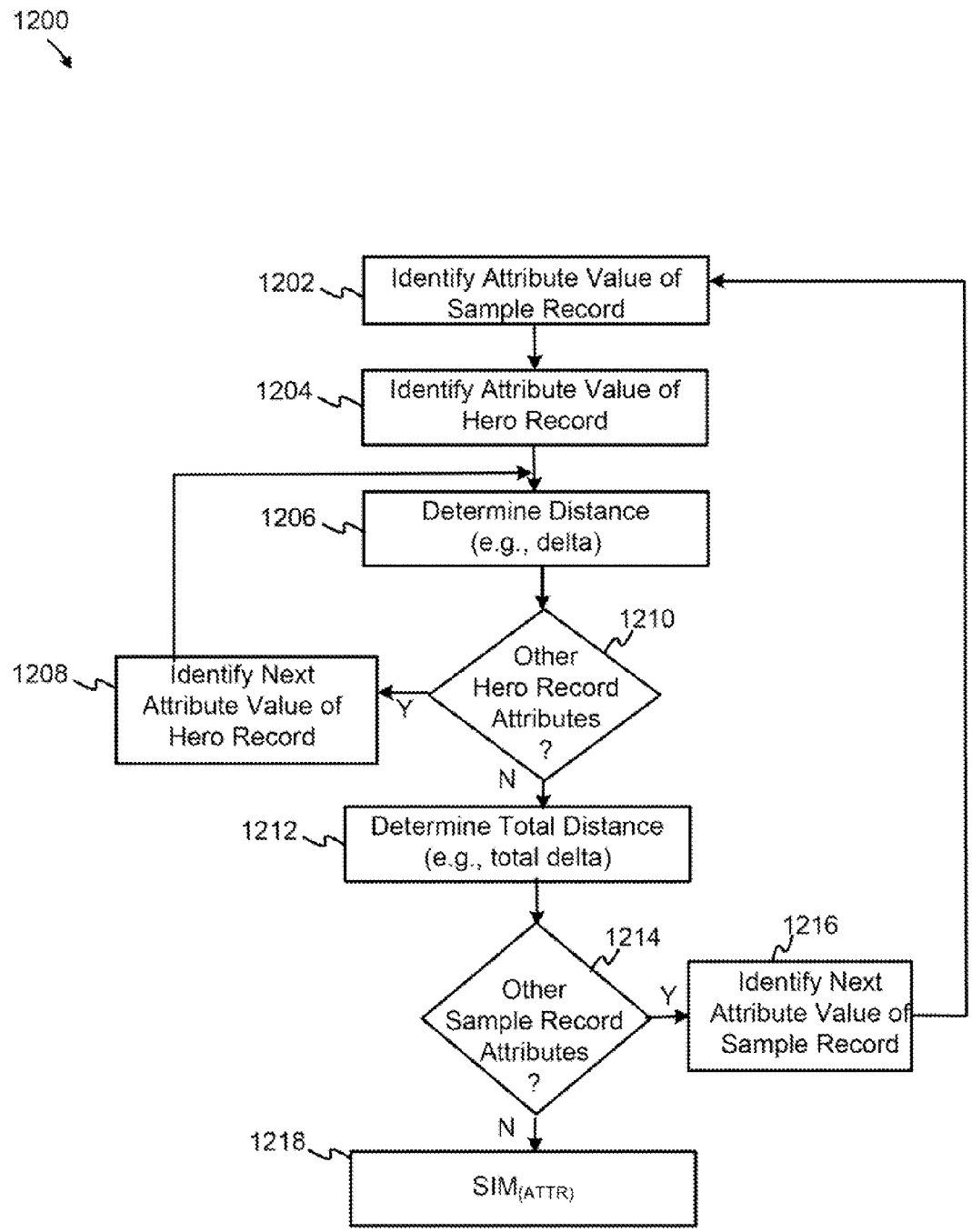
FIG. 12 is a diagram depicting a flow of determining attribute similarity values, according to one embodiment.

FIG. 12 is a diagram depicting a flow of determining attribute similarity values, according to one embodiment. At 1202, flow 1200 identifies an attribute value of a sample record, such as "4" corresponding to a "blue" attribute. At 1204, flow 1200 identifies an attribute, value of a hero record for a corresponding attribute, such as "1" corresponding to a "yellow" attribute. At 1206, a distance is calculated to be "3" (e.g., 4−1=3). If there are no further attribute values to consider, flow 1200 passes through 1210 and uses "3" and the total distance as it passes through 1214. At 1218, attribute similarity value, $SIM_{ATTR}$, is determined by dividing distance by the set size, which is 5 in this example. Thus, attribute similarity value is "0.6" (e.g., ⅗=0.6, as normalized).

Figure 13:
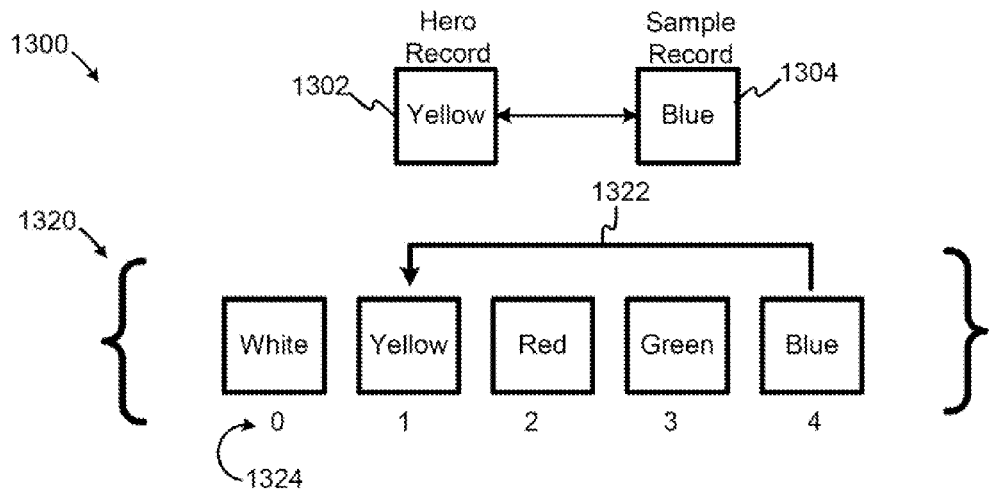
FIG. 13 is a diagram depicting one example of determining similarity using a distance between attributes of a sample record and a hero record, according to some examples.

FIG. 13 is a diagram depicting one example of determining similarity using a distance between attributes of a sample record and a hero record, according to some examples. Diagram 1300 depicts a distance 1322 between a yellow attribute of hero record 1302 and a blue attribute of sample record 1304, as described above in FIG. 12. The attribute values 1324 identify the position of an attribute in set 1320. Returning back to FIG. 12, when flow 1200 identifies other attribute value's at 1208 for the hero record and/or identifies other attribute values at 1216 for the sample record, then flow 1200 determines an attribute similarity value, $SIM_{ATTR}$, as depicted in FIG. 14.

Figure 14:
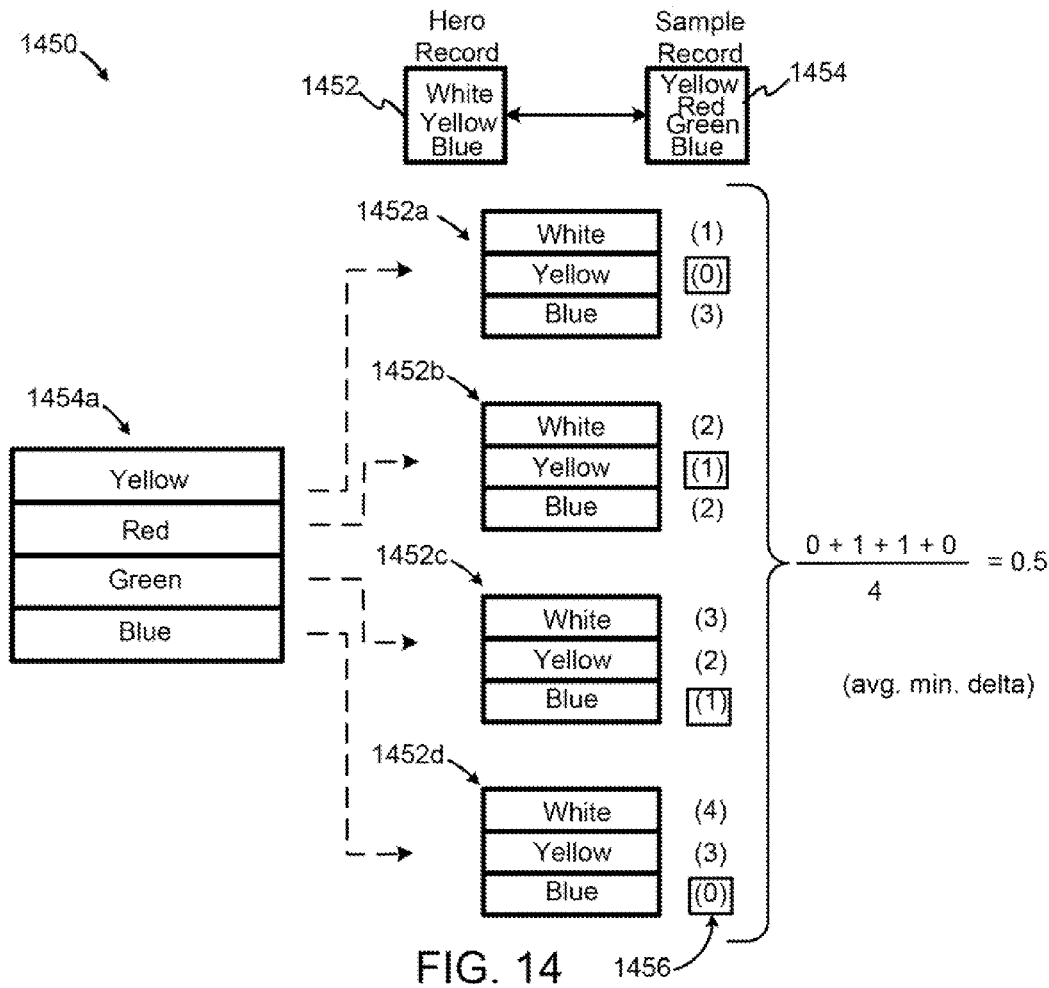
FIG. 14 depicts the determination of an attribute similarity value, according to some examples.

FIG. 14 depicts the determination of an attribute similarity value, according to some examples. Diagram 1450 depicts distances 1456 determined between attributes in group 1454a and attributes in groups 1452a to 1452d. In particular, attribute value "Yellow" of 1454a is selected at 1202 and attribute value "White" of 1452a is selected at 1204, with subsequent color attributes values of 1452a being determined at subsequent passes to 1210 of FIG. 12. The next attribute value "Red" of sample record 1454a is selected at 1216 of FIG. 12, with similar flows as described above. A minimum distance 1456 for each group 1452a to 1452d is determined and, in this illustration, has a square around the value. Using these values, an average minimum delta is 0.5, as shown. This value is divided by 5 (i.e., the color set size) to yield an attribute similarity value of 0.1 (e.g., a normalized attribute similarity value). As another example, consider than an attribute of a record may have multiple values. For example, a color attribute of a sample record can include two colors: Red or Blue (e.g., Color={Red, Blue}) To determine similarity values, the position of each value in an ordered attribute set of {White, Yellow, Red, Green, Blue} can be described as {0, 1, 2, 3, 4}, such as depicted in FIG. 13. Returning to the color attributes for the sample record in this example, the set {Red, Blue} can be described {2, 4}, which are the positions relative to the ordered attribute set.

Figure 15A:
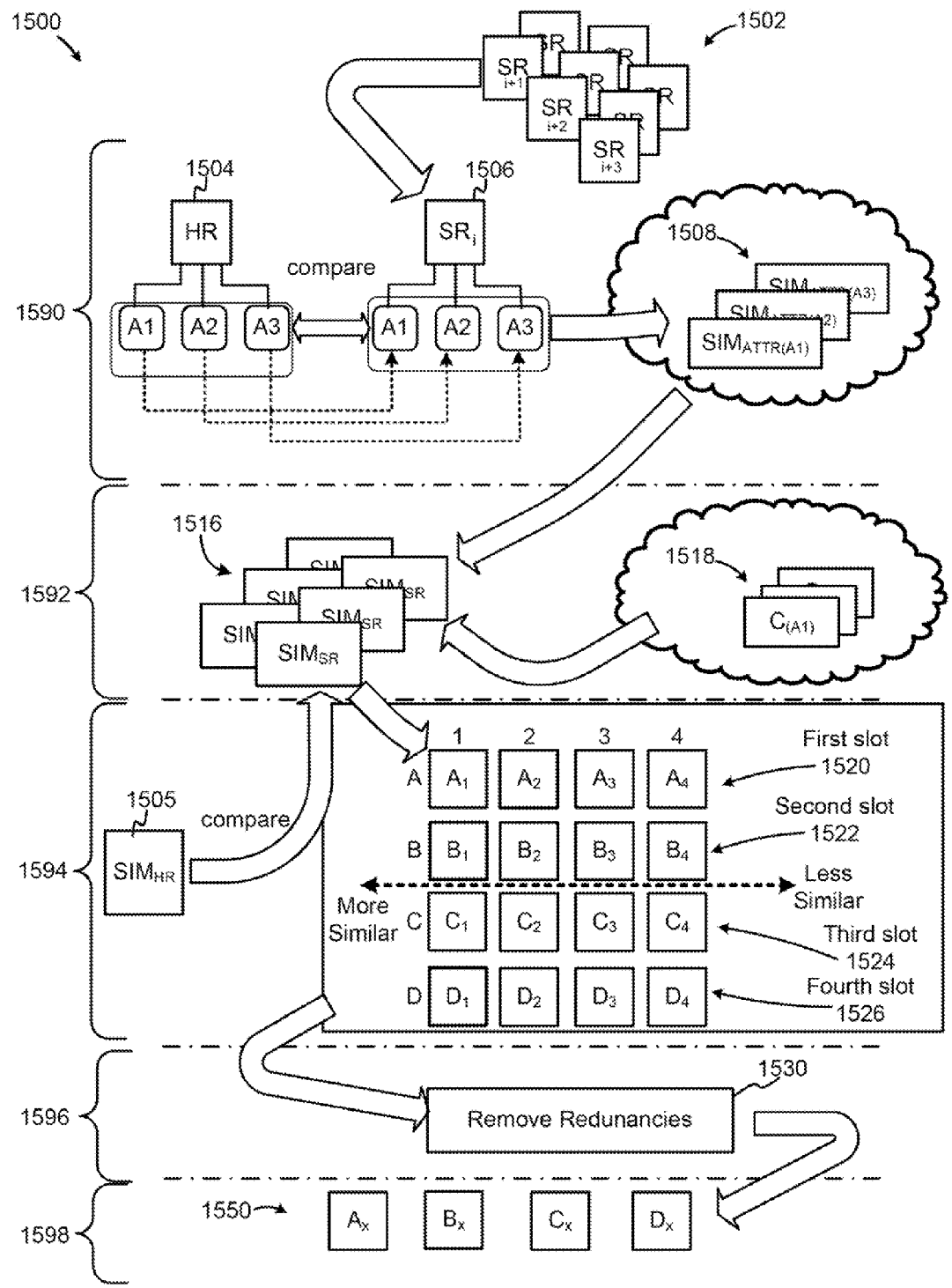
FIG. 15A is pictorial representation of a flow for determining similarity values for records relative to a hero record, according to some examples.

FIG. 15A is pictorial representation of a flow for determining similarity values for records relative to a hero record, according to some examples. In particular, diagram 1500 depicts one or more phases 1590 to 1598 for determining similarity values of records that are to be initialized as being associated with perceptible items, including intersection items and interstitial items. A pass through phases 1590 to 1598 can determine a subset of intersection similarity values (e.g., four similarity values $A_x$, $B_x$, $C_x$, and $D_x$ of FIG. 15C), a subset of first level interstitial similarity values (e.g., four similarity values $A_y$, $B_y$, $C_y$, and $D_y$ of FIG. 15C), or a subset of second level interstitial similarity values (e.g., four similarity values $A_z$, $B_z$, $C_z$, and $D_z$ of FIG. 15C). In phase 1590, individual sample record ("SR") 1506 are selected from a group 1502 of records (i.e., a master set of records) to determine attribute similarity values. Sample record 1506 and those in group 1502 of records have or are associated with attributes A1, A2, and A3, against which are compared against attributes A1, A2, and A3, respectively, of a hero record ("HR") 1504. Attributes A1, A2, and A3 can represent different attributes or different attribute values (i.e., multiple values of an attribute) of an individual attribute. According to some embodiments, one or more functionalities in phase 1592 can be implemented by logic 502 of FIG. 5, including attribute similarity determinator 522.

A number of similarity values ("$SIM_{ATTR}$") 1508 are calculated for attributes for single or multiple records. Examples of determining similarity values for an attribute are described, for example, in FIGS. 13 and 14. In phase 1592, a group 1516 of similarity values for records is determined optionally with weighting coefficients 1518. When calculating record similarity values to be associated with an intersection (e.g., of a row and a column), the attributes and attribute values for the row and the column are removed from the calculation. That is, using Equation 1 above for a column having an attribute X and row having an attribute Y that intersect, a set of attributes, $SET_{ATTR}$, is used to calculate the similarity $SIMSET_{ATTR}$. The contents of $SIMSET_{ATTR}$ can be expressed as follows:

$SIMSET_{ATTR} \subseteq SET_{ATTR}$, and $X \notin SIMSET_{ATTR}$ and $Y \notin SIMSET_{ATTR}$, whereby attributes X and Y form no part of the set (i.e., are ignored in the similarity value calculations).

By contrast, when calculating record similarity values to be associated with an interstitial slot (e.g., in a row or a column between intersection slots), the attributes and attribute values for the row or the column are removed from the calculation. That is, using Equation 1 above for a column or a row having an attribute, a set of attributes, $SET_{ATTR}$, is used to calculate the similarity $SIMSET_{ATTR}$. The contents of $SIMSET_{ATTR}$ can be expressed as follows:

$SIMSET_{ATTR} \subseteq SET_{ATTR}$, and $X \notin SIMSET_{ATTR}$, whereby attribute X forms no part of the set (i.e., is ignored in the similarity value calculations).

According to some embodiments, one or more functionalities in phase 1594 can be implemented by logic 502 of FIG. 5, including record similarity determinator 524.

In phase 1594, the average best fit for the similarity values is calculated. In other words, phase 1594 is used to calculate the best overall fit to maximize similarity while selecting intersection records and interstitial records. According to some embodiments, phase 1594 implements a "best-fit" algorithm. In phase 1594, a number of record similarity values ("$SIM_{SR}$") 1516 are compared against a record similarity value of a hero record ("$SIM_{HR}$") 1505, which may be zero as the hero record is not displaced from itself (i.e., the delta is zero). As shown, four sets are created and sorted by how similar the records are to hero record 1504, whereby the sets can be stored in a cache. Note that the ordered sets are not the same as a sorted column or row as depicted, for example, in FIG. 15D. To identify the best fit (i.e., the most similar) for a record to either an intersection or interstitial slot, a grid (e.g., 4×4) of the four most similar records (e.g., records $A_1$ to $A_4$, $B_1$ to $B_4$, $C_1$ to $C_4$, and $D_1$ to $D_4$) in each of the four sets (e.g., sets A, B, C, and D). The four sets each can be associated with a slot into which one record (of four) is disposed in either first slot 1520, second slot 1522, third slot 1524, and fourth slot 1526. A select best fits algorithm can be implemented to pass in the 16 (4×4) records sorted in order of best (e.g., column 1) to worst (e.g., column 4) along with their corresponding similarity values. This will return the 4 records best suited for each slot.

In phase 1596, redundancies or duplicate records 1590 are removed, and at phase 1598, the optimal (e.g., most similar) records 1550 out of the grid are determined. For example, when conflicts exists (e.g., same similarity values) in a column of a 4×4 grid of records, a similarity processor of the various embodiments is configured to check for duplicate values for the most similar records, and while there are duplicate records the similarity processor can resolve the duplicates and truncate record sets (e.g., sets A, B, C, and D in phase 1594 of the example) by removing duplicate records. The delta values between the first (e.g., between HR and A1), second (e.g., between HR and A2), third second (e.g., between HR and A3), and fourth (e.g., between HR and A4) best fits records are used as part of the selection process for the best-fit records to use. Generally, the slot most negatively impacted by falling back to a less similar record is given the best-fit position. See FIGS. 16A to 16F for examples of the implementations of at least phases 1596 and 1598. Again, phases 1590 to 1598 can be passed through to determine a subset of intersection similarity values and subsets of interstitial similarity values. According to some embodiments, one or more functionalities in one or more of phases 1594, 1596, and 1598 can be implemented by, for example, executable instructions in association with logic 502 of FIG. 5. Further, logic 502 of FIG. 5 can be configured to execute instructions to provide for flows 1000, 1100 and 1200 of FIGS. 10, 11 and 12, respectively.

Figure 15B:
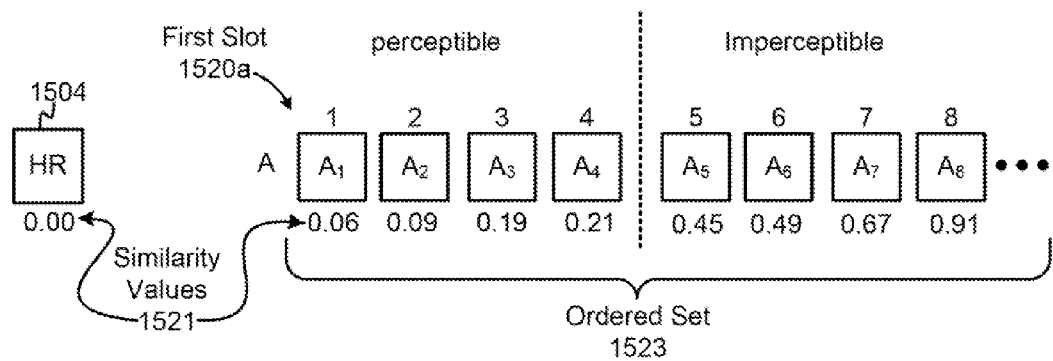
FIG. 15B illustrates an ordered set having elements arranged by similarity values, according to an embodiment.

FIG. 15B illustrates an ordered set having elements arranged by similarity values, according to an embodiment. According to phase 1594, sets are determined based on similarity values 1521. Here, an ordered set 1523 is depicted for first slot 1520a, with other sets (e.g., B, C, and D) being omitted. As shown, the four most similar records (e.g., closer to 0) are disposed at or associated with slots A1 to A4, whereas less similar records (e.g., closer to 1) are disposed at slots A5 and above. Note that ordered set 1523 is not necessarily used to populate slots associated with imperceptible items or records, for which, for example, a sorter module is used.

Figure 15C:
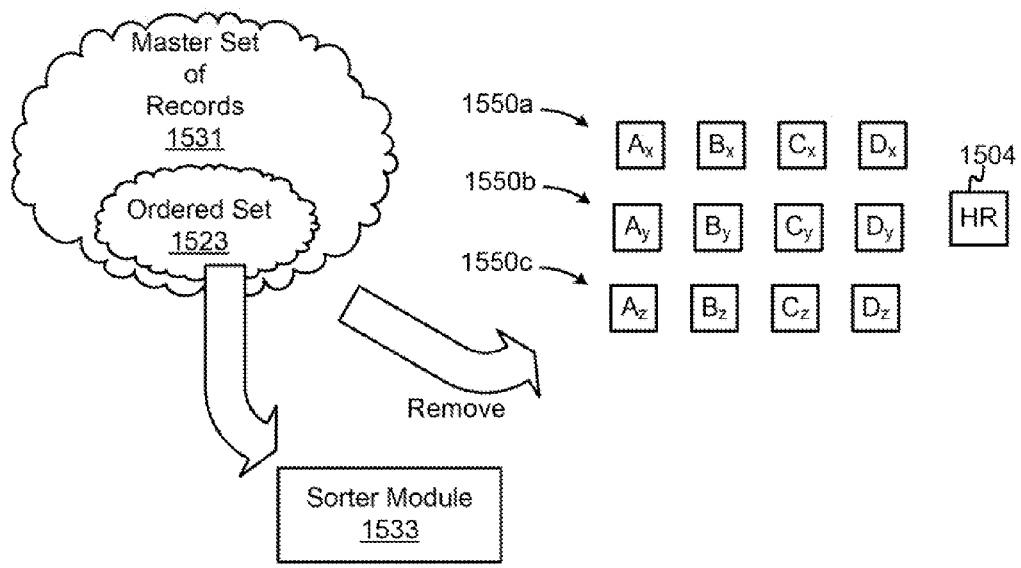
FIGS. 15C and 15D depict implementations of a sorter module, according to various embodiments.
Figure 15D:
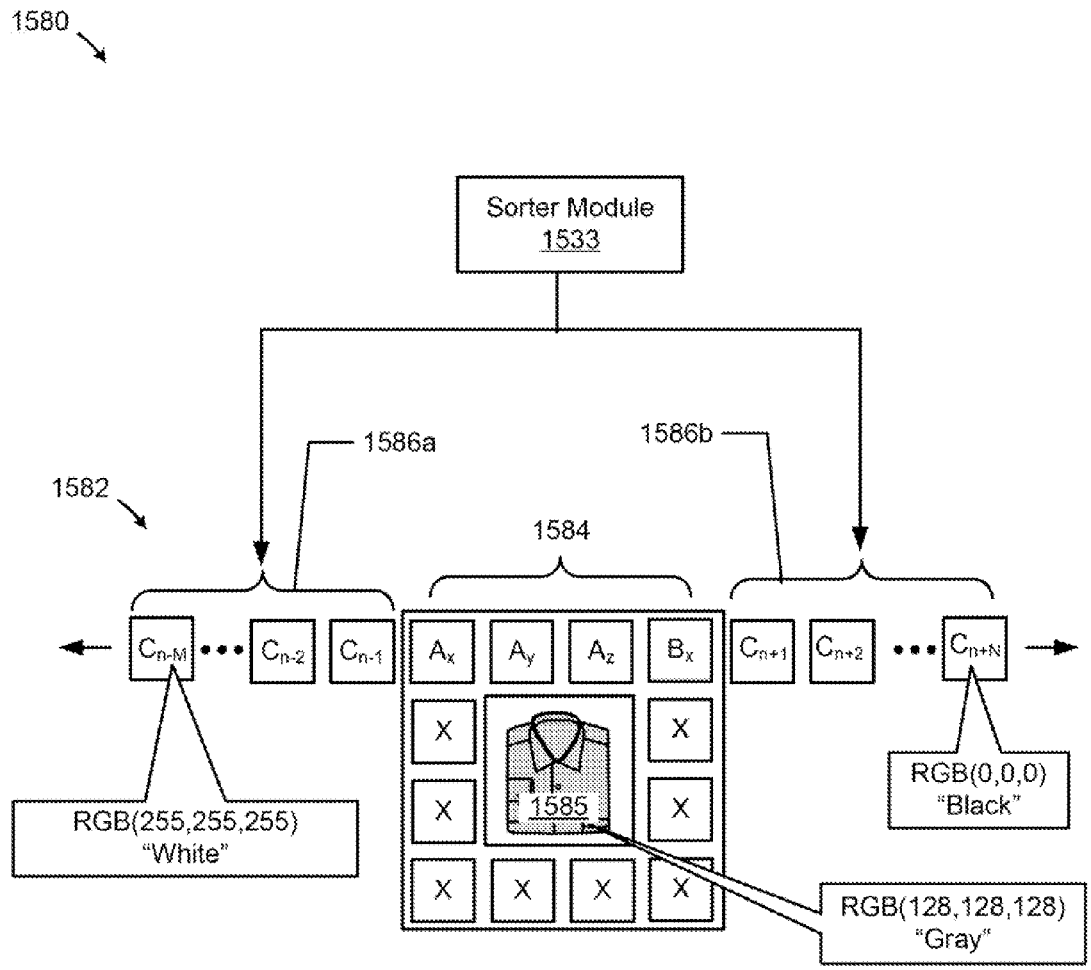
Figure 15D:
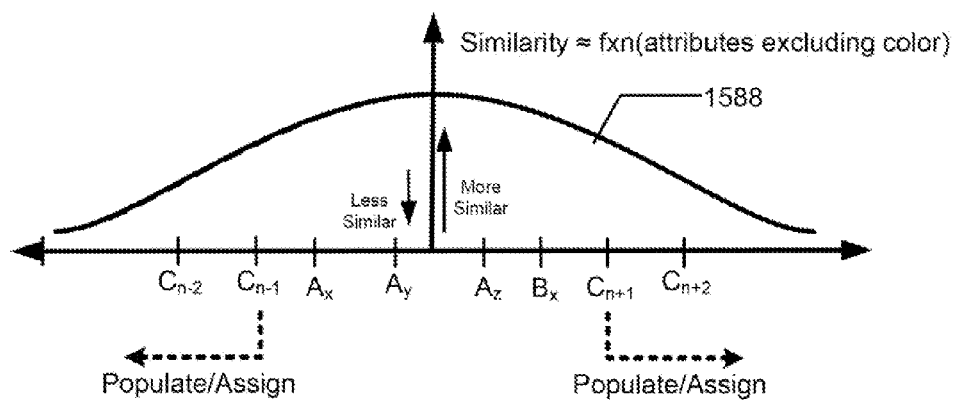

FIGS. 15C and 15D depict implementation of a sorter module, according to various embodiments. In FIG. 15C, records 1550a reserved for intersection slots (e.g., first pass through phases 1590 to 1598), records 1550b reserved for first level interstitial slots (e.g., second pass through phases 1590 to 1598), and records 1550c reserved for second level interstitial slots. Also shown is hero record 1504. Each of the aforementioned records are removed from a master set of records 1531. Ordered set of records 1523 of FIG. 15C is passed to a sorter module 1533, which is configured to identify positions or slots of records for display in an interface.

FIG. 15D is a diagram 1580 including a sorter module 1533 configured to receive ordered sets, and to configured further to distribute a first subset of records 1584, as perceptible records, in slots of a sequence or set 1582 for display in an interface. Sorter module 1533 is also configured to dispose less similar records in a second subset 1586a and a third subset 1586b of records, according to similarity values 1588 relative to the position of a record in sequence or set 1582. In this example, consider that a color attribute varies in sequence or set 1582 from record $C_{n-M}$ to record $C_{n+N}$. Therefore, different records in sequence or set 1582 can be arranged first in accordance with similarity values 1588, which excludes consideration of the color attribute. Further, the color attribute can start from a first value (e.g., RGB (255, 255, 255)) representing a light or white color to a second value (e.g., RGB (0, 0, 0)) representing a dark or a black color. Average RGB values from record $C_{n-M}$ to record $C_{n+N}$ can be any average range from 255 at the left-most terminus record to 0 at the right-most terminus record. In one example, records 1584 can be optionally initialized to include a color attribute most similar to hero record 1585, which can include a color attribute value (e.g., RGB (128, 128, 128)) approximately medial to the two ends of sequence or set 1582. Other examples of uses of ordered sets by sorter module 1533 is depicted in FIG. 7.

FIGS. 16A to 16F depict an example of a sequence of using one or more matrices of similarity values to resolve duplicates or redundancies, according to some embodiments. FIGS. 16A and 16F implement a Best-Fit technique to determine the best-suited records. The best-fit technique generates a matrix of any size. In this example, the matrix includes 16 records arranged with 4 rows and 4 columns. The records in the matrix are sorted in order of best to worst along with $th_{eir}$ correspondi$_{ng}$ record similarity values. In FIG. 16A, records 1602 demarcated by a thick line are duplicates, as are records 1604, which are demarcated by a dotted line. In this example, A, B, C, and D, can correspond to either an intersection record slot 1003 of FIG. 10 or an interstitial record slot 1013 or 1023 of FIG. 10. Returning back to FIG. 16B, similarity values are disposed in the matrix with the $_{bes}$t similarity $_{va}$lues in column 1 and the worst values in column 4 (other less similarity values are not shown, but can be implemented in other variations). In FIG. 16C, the deltas between column 1 and column 1 results in delta value of "zero," as shown, whereas deltas between column 1 and the other columns are disposed in columns 2 to 4. A conflict exists between A1 and C1 (i.e., both are zero and are essentially duplicates), so the next values are examined. As shown in FIG. 16D, the distance to next best value for A is 0.05, which is less than the next best value for C, which is 0.30 (i.e., 6 time as large). Therefore, the record at C1 is selected (as shown within a circle) as the negative impact of selecting A1 results in a larger deviation of C (e.g., C2 or 0.30) from the hero than selecting the second choice for A, which is A2 (e.g., 05, which is more similar than 0.30). In FIG. 16E, records A1, B4, and D1 are removed as being duplicates and are not considered further. This moves record A2 into the column 1 position. Records A2, B1, and D1 are indicated as being duplicates, as shown by the dashed lines. In FIG. 16F, the duplicates are resolved by determining deltas. Since the removal of record A2 generates the most negative impact, record A2 is selected (e.g., A3 is 0.05, whereas B2 and D3 are respectively 0.01 and 0.04 and deviate less from the hero item than the selection of A3). With selection of A3, duplicate records B1 and D1 are removed. Thus, next records D3 and B2 are selected. The above technique is an example and the sizes of the matrix, which can be more or fewer, and the processes to determine the best-fit value can be modified.

Figure 17:
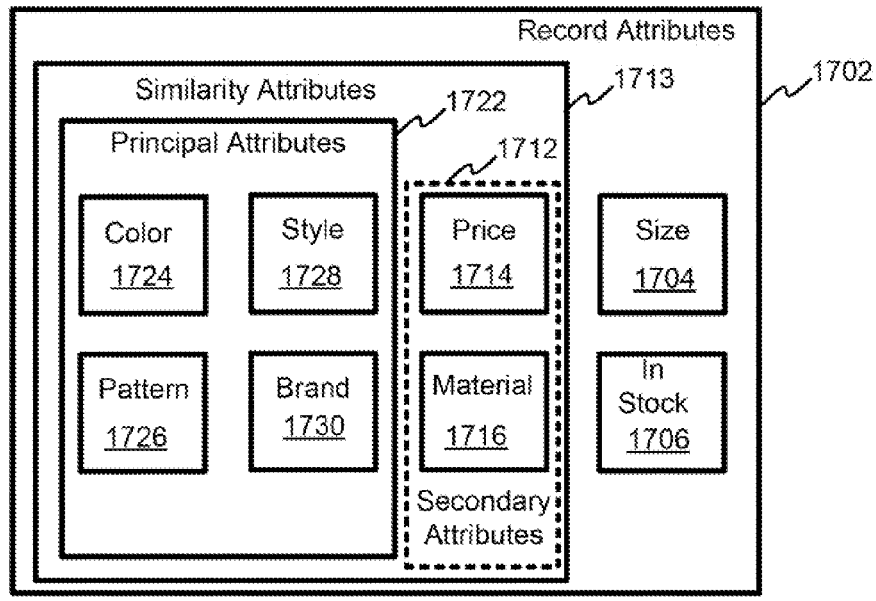
FIG. 17 depicts various sets of attributes having various levels of importance relative to being used to search and discover items in accordance to various embodiments.

FIGS. 17 to 20 depict various aspects of a system for generating data arrangements for implementing a catalog, according to some embodiments. FIG. 17 depicts various sets of attributes having various levels of importance relative to being used to search and discover items in accordance to various embodiments described herein. In one embodiment, a record or a group of similar records can share common record attributes 1702, which include the universe of attributes from 1704 to 1730. Attributes 1702 may represent a combination of a stock-keeping unit ("SKU") attribute data and product attribute data. Further to this example, attributes 1724, 1726, 1728, and 1730 determined to define, at least at initialization, selectable attributes 1722 associated with one of either two rows or two columns. Therefore, similarity values are principally determined based on values and distances for attributes 1724, 1726, 1728, and 1730. In some cases, these attributes can be determined as the most utilitarian by users in searching for items, such as products. Also, attributes 1712 include attributes 1714 and 1716 that are of secondary importance. Once a final hero item is determined, a user can use secondary attributes 1714 and 1716 to refine discovery of a desired item. In some embodiments, a similarity processor can be configured to promote secondary attributes 1712 to one of principal attributes 1722 based on data from an analytics engine (not shown) indicating, for instance, one or more users' preference for using one of secondary attributes 1712 rather than one of principal attributes 1722. Note that in various embodiments, similarity values are calculated based only on principal attributes 1722, whereas in alternate embodiments, similarity values are calculated based on principal attributes 1722 and secondary attributes 1712. Therefore, as part of a catalog set-up process, two types of attributes may be defined by a first type, which are principal attributes 1722 for representing rows and columns, and a second type, which includes a superset of attributes 1713 for determining similarity values. For example, an intersection similarity determination excludes two of principal attributes 1722 and uses the other two principal attributes 1722 and secondary attributes 1712 to determine a similarity value.

Figure 18A:
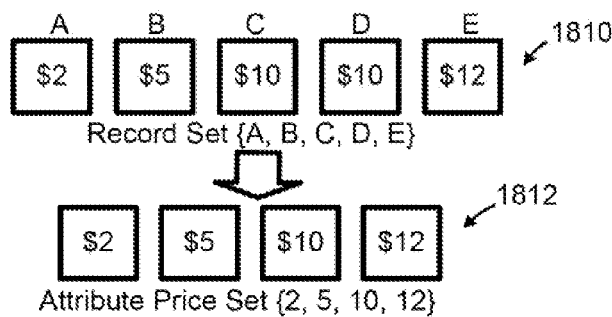
FIGS. 18A and 18B depict illustrations of forming attribute sets, according to some embodiments.
Figure 18B:
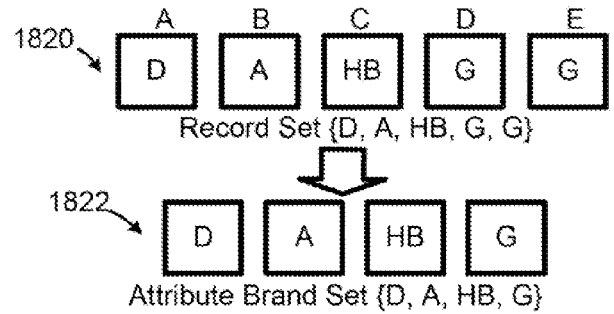

FIGS. 18A and 18B depict illustrations of forming attribute sets, according to some embodiments. According to various examples, attributes and/or attribute values are represented as attributes sets, whereby attribute values can be continuous, such as price, or domain-bounded attributes, such as style or brand. An attribute set can be considered as a sequence (i.e., an ordered set). While straight-forward for numerical attributes like price (or perhaps size), domain-bound attributes can require a specific order. For example, color may be ordered light to dark. The HTML standard supports 147 color names (aqua, aquamarine, azure, etc.). An administrator may have a specialized set of colors based on the type of product represented. The same case can be made for size attribute values: S, M, L, XL, XXL. With some large domains, a sorting algorithm can be implemented (e.g., using sorting module 1533 of FIGS. 15C and 15D). For example, it requires resources to sort every city in the United States in a sequential order. Automatically sorting them by distance from one another is more easily accomplished through the use of an applied distance calculation.

FIG. 18A depicts formation of an attribute price set, according to an example. While SKU data can cover a range of continuous prices, such as between $2 to $100, the attribute price set 1812 is generated from record set 1810 by including unique values of prices. That is, duplicate price values (e.g., two $10 prices) for an attribute are represented as one attribute value. Therefore, representing continuous attributes, such as price, as ordered sets can be useful as the same calculations can be applied for a value-based attribute like price as that used for a domain-bound attribute, like style or pattern. In some cases, domain-bound attributes and values-based attributes may be handled as ordered sets, whereby domain-bound attributes are ordered into a sequence.

FIG. 18B depicts formation of another attribute price set, according to another example. In this example, the attribute "brand," as it pertains to shirts, is a domain-bound attribute. Record set 1820 includes records having duplicative attributes, such as brand "G." An attribute brand set 1822 is generated from record set 1820, whereby the records including attributes "D," "A," "HB," and "G" are positioned in a specific order (i.e., ordered by similarity). As such, a distance between different records' attributes can be determined similar to the distances with color sets of FIG. 13. Setting up attribute sets as described above can be a precursor activity prior to generating a catalog.

Figure 19:
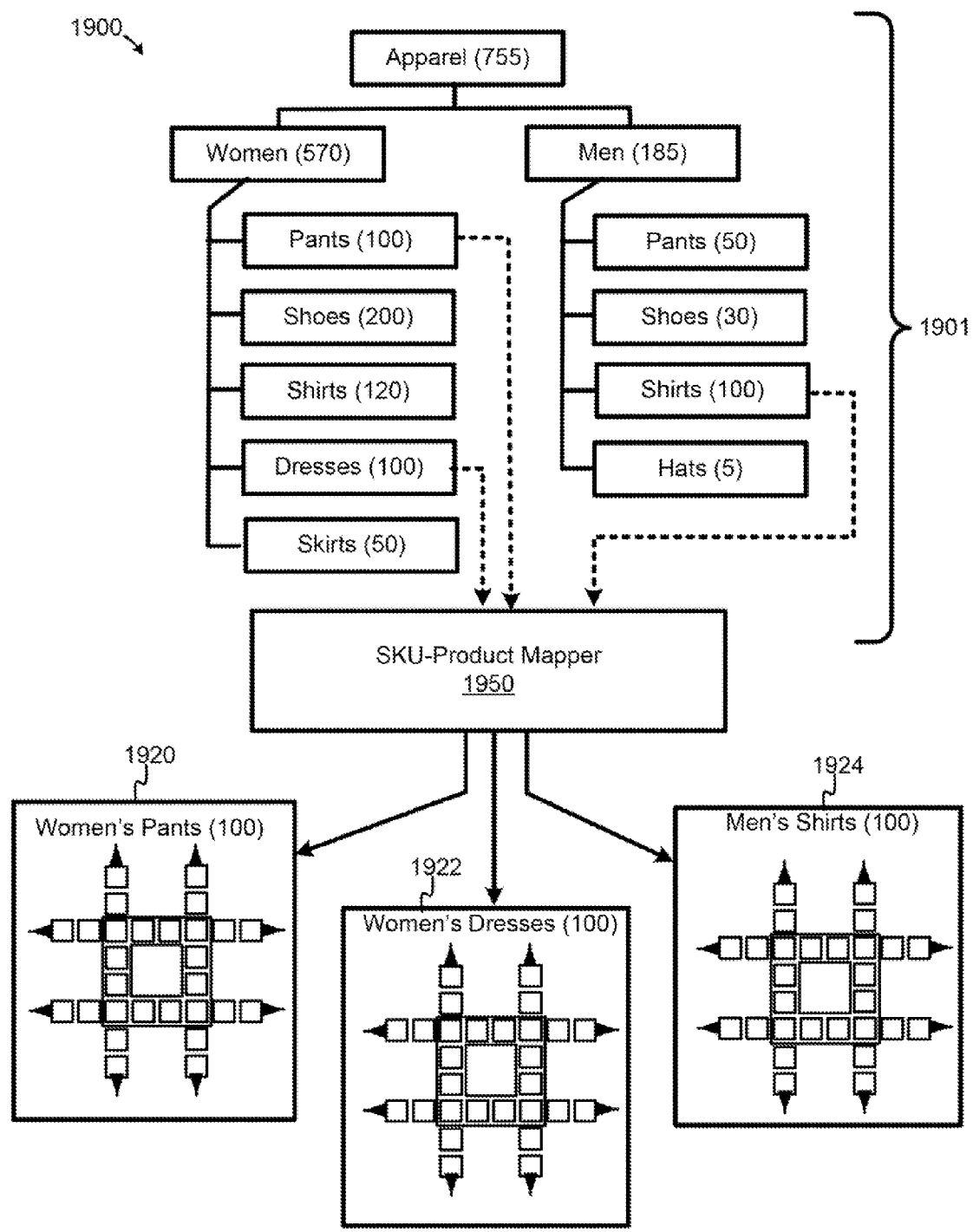
FIG. 19 illustrates an example of a data structure mapping module configured to form data arrangements to facilitate the discovery techniques described herein, according to various embodiments.

FIG. 19 illustrates an example of a data structure mapping module configured to form data arrangements to facilitate the discovery techniques described herein, according to various embodiments. Initially, data can be structured to include data representing either SKUs and/or product attributes. Generally, for product catalogs, the data structure can contain several hundred nested product categories with many-to-many relationships between products and the categories to which they belong. This multi-tiered hierarchy is sometimes necessary to navigate what are often more than a hundred thousand SKUs. Diagram 1900 depicts a multi-tiered data structure 1901 in which SKU data is stored. SKU-Product Mapper 1950 is configured to access data structure 1901 to extract or relate data to data arrangement described herein to facilitate item discovery. Further, SKU-Product Mapper 1950 is configured to map, for example, catalog subcategories of data structure 1901 to item-specific data arrangements 1920, 1920, and 1924. For example, a subcategory of women's dresses can based on SKU and Product data and data relationships. SKU-Product Mapper 1950 is configured to map the data and data relationships to form a data arrangement 1920 based on similarity values. SKU-Product Mapper 1950 is configured to also perform similar mapping to form data arrangements 1922 and 1924. In some examples, an underlying product catalog (in the case of an ecommerce implementation) can be modified to support RESTful API calls to and from a mobile application. Further, a unit of data referred to as a "record," as described herein, can include data associated with SKU and Product attributes.

Figure 20:
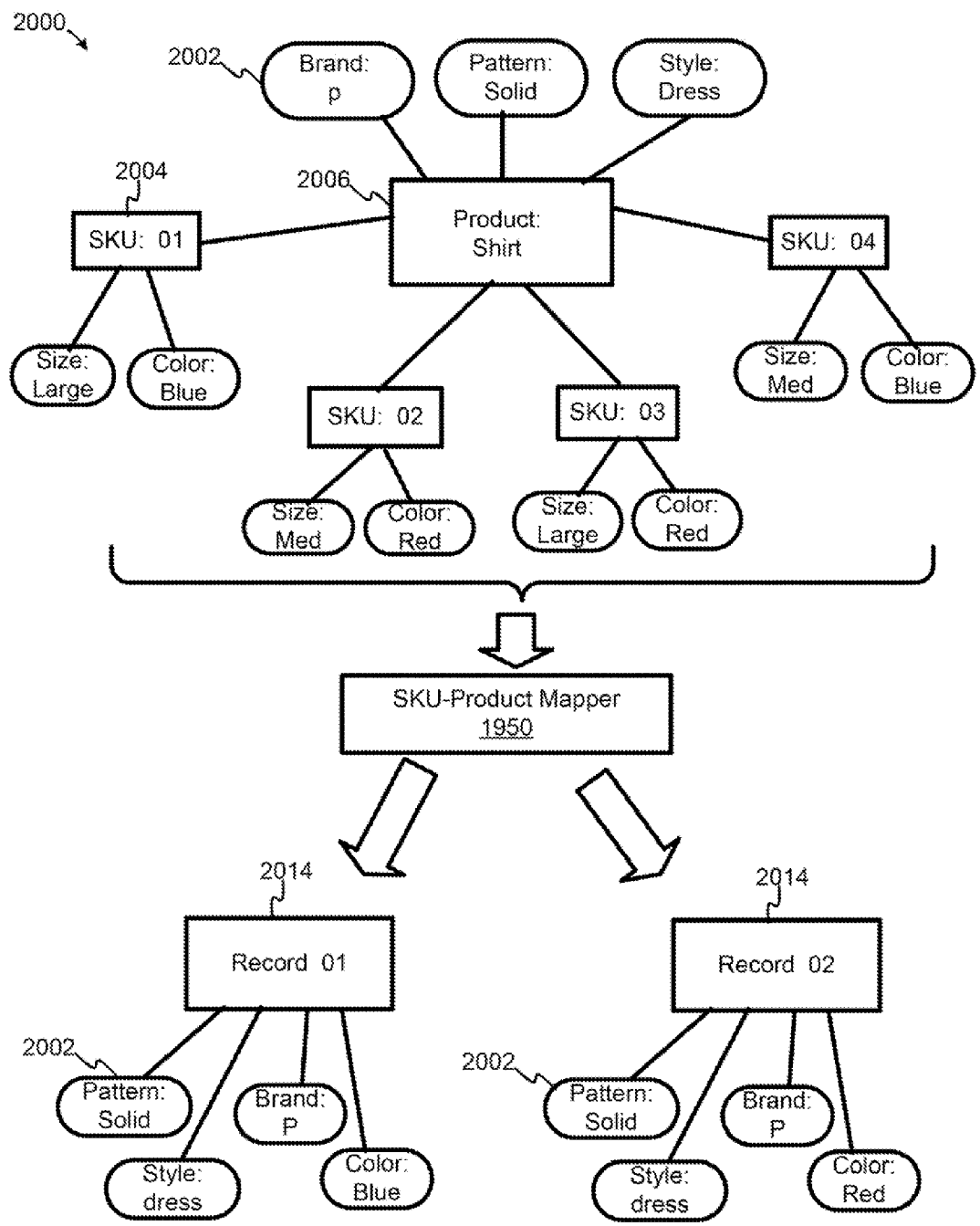
FIG. 20 is another example implementation of a data structure mapping module, according to an embodiment.

FIG. 20 is another example implementation of a data structure mapping module, according to an embodiment. Diagram 2000 depicts SKU-Product Mapper 1950 forming records for implementation by the structures and/or functions described herein. In particular, SKU-Product Mapper 1950 is configured to access data in data sets including SKU data sets 2004 and product data sets 2006 that include product attributes 2002. Further, SKU-Product Mapper 1950 is configured to generate unit data structures shown as records 2014, each including attributes derived from SKU data sets 2004 and/or product attributes 2002. As data is formatted in the record format, similarity values can be determined between attributes of different records, as describe herein.

Figure 21A:
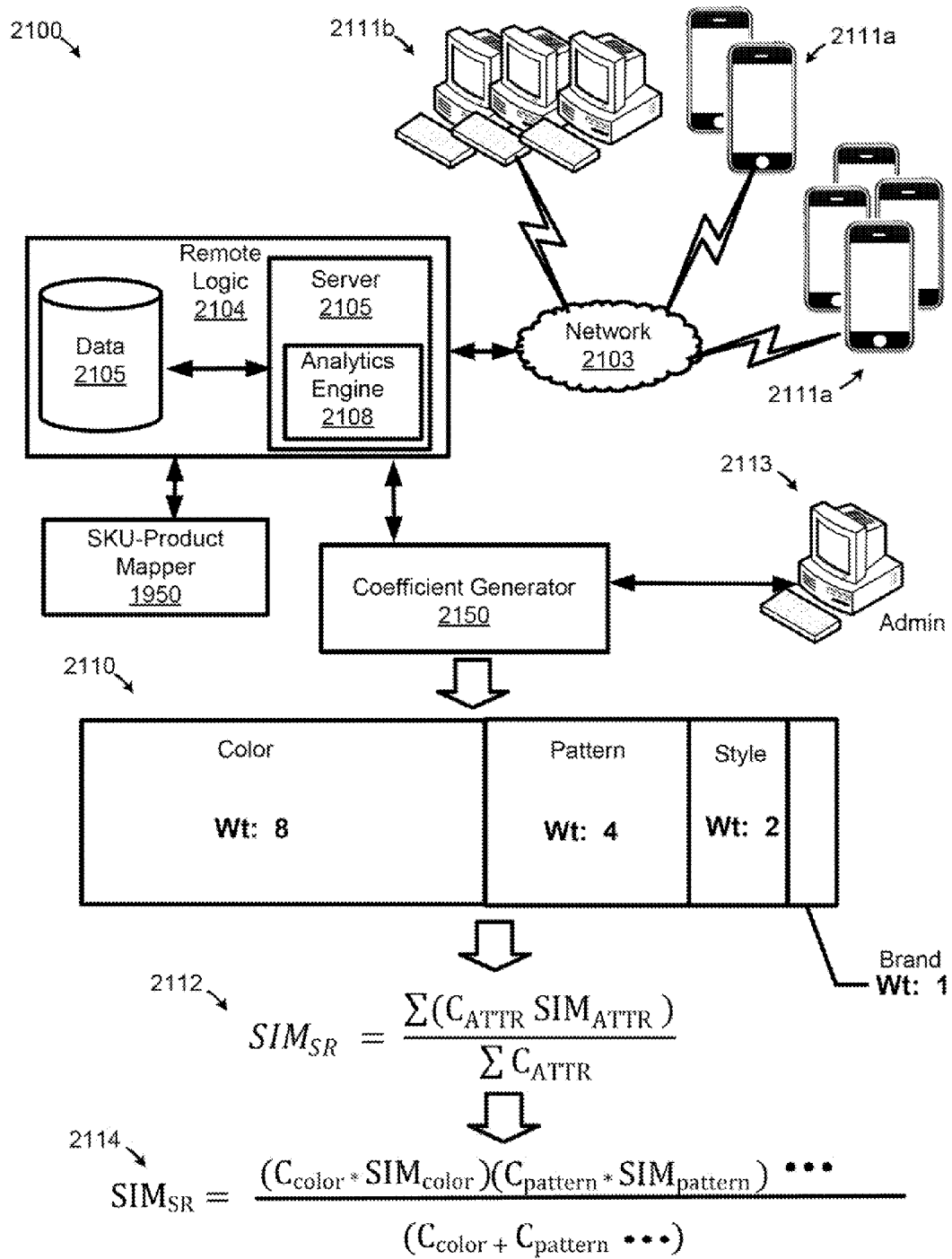
FIG. 21A depicts a system for generating coefficients for adjusting similarity values, according to some embodiments.

FIG. 21A depicts a system for generating coefficients for adjusting similarity values, according to some embodiments. Diagram 2100 includes remote logic 2104 implementing a repository 2105 and a server 2105, remote logic 2104 being coupled to mobile communication devices 2111a and computing devices 2111b. Remote logic 2104 is coupled to SKU-Product Mapper 1950 to store data arrangements, relationships and data values in repository 2105. Analytics engine 2108 is configured to analyze data, including attributes used for searching by users at communication devices 2111a and computing devices 2111b, to determine preferences of attributes by users in searches, or any other factors in determining how best to enhance the item discovery process. In turn, analytics engine 2108 can generate coefficients for modifying the weights of different similarity values. Or, in other cases, an administrator at computing device 2113 can determine the values of coefficients.

Attributes can be weighted based on their relative contribution to similarity. For example, color may be more important than material, and material may be more important than price. Thus, as records can many attributes, those attributes may be amplified or dampened relative to one another to produce an optimized result. For example, in a "Shirts" category where price varies 20% between the lowest priced shirt and the highest price shirt, color may be better attribute in determining similarity. Price might be included in the calculation, but dampened with respect to the color attribute. In some embodiments, coefficients can be tunable, automatically or manually, and each represents a value statement as to the importance of that particular attribute in determining similarity. Consider the attributes pattern, style, brand and color for shirt products. The following weights imply that color is the important signal: $C_{COLOR}=8$, $C_{PATTERN}=4$, $C_{STYLE}=2$, and $C_{BRAND}=1$, as shown in pictorial representation of weighting ("Wt") 2110. Thus, an "brand" attribute contributes the least amount and has least influence in determining similarity values. The coefficients (weights) associated with each attribute may vary based on the type of product. For example, price may be more important in selecting a television than a pair of shoes. As these coefficients are somewhat subjective, when considered manually, iterative testing/tuning can be performed to establish optimal weighting values for coefficients in each category. As shown, the coefficients can be used in relationships 2112 and 2114 to determine record similarity values.

Figure 21B:
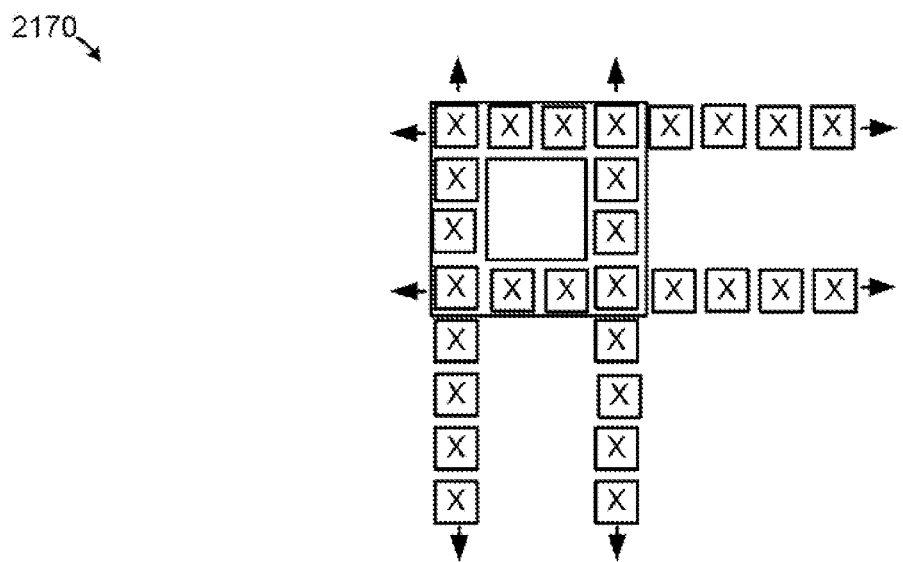
FIGS. 21B and 21C illustrate alternative implementations of an interface, according to some embodiments.
Figure 21C:
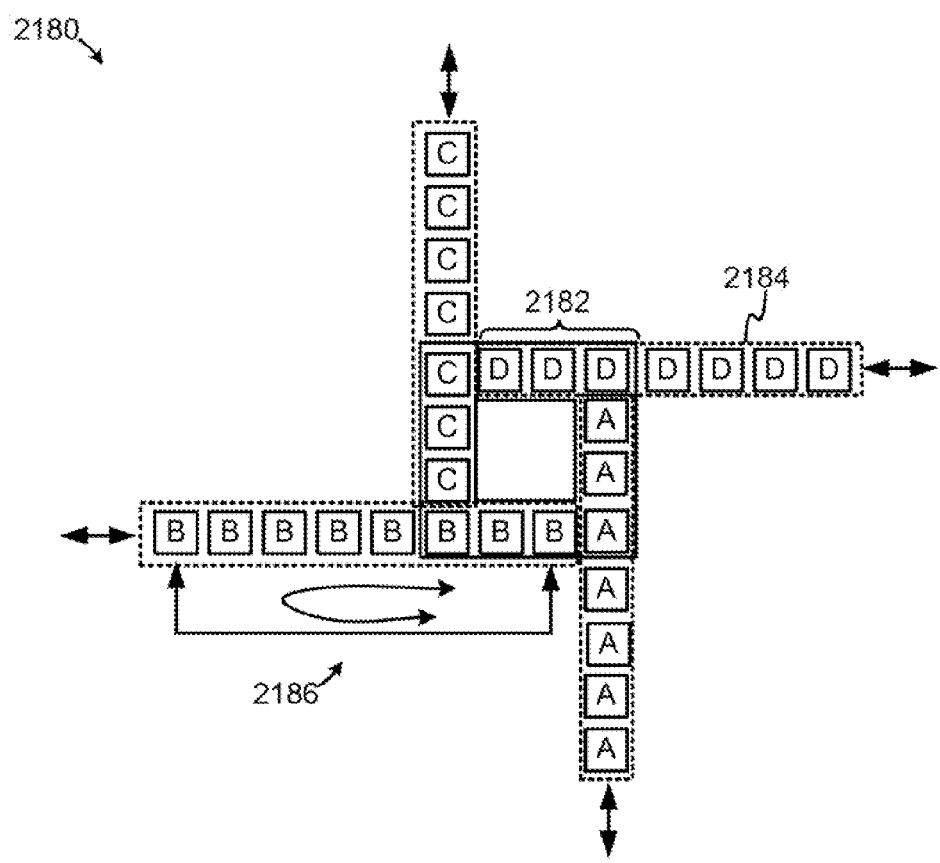

FIGS. 21B and 21C illustrate alternative implementations of an interface, according to some embodiments. Diagram 2170 of FIG. 21B illustrates that a sequence and/or set can be aligned such that terminus records fall within or adjacent to the visible region. Diagram 2180 of FIG. 21C illustrates that sequences or sets 2184 need not intersect. As shown, subset 2182 is perceptible, but does not intercept the other set with "C" attributes. Item representations can be urged in directs 2816 in a wrap-around fashion. Other configurations are possible and those described above are not intending to be limiting.

Figure 22:
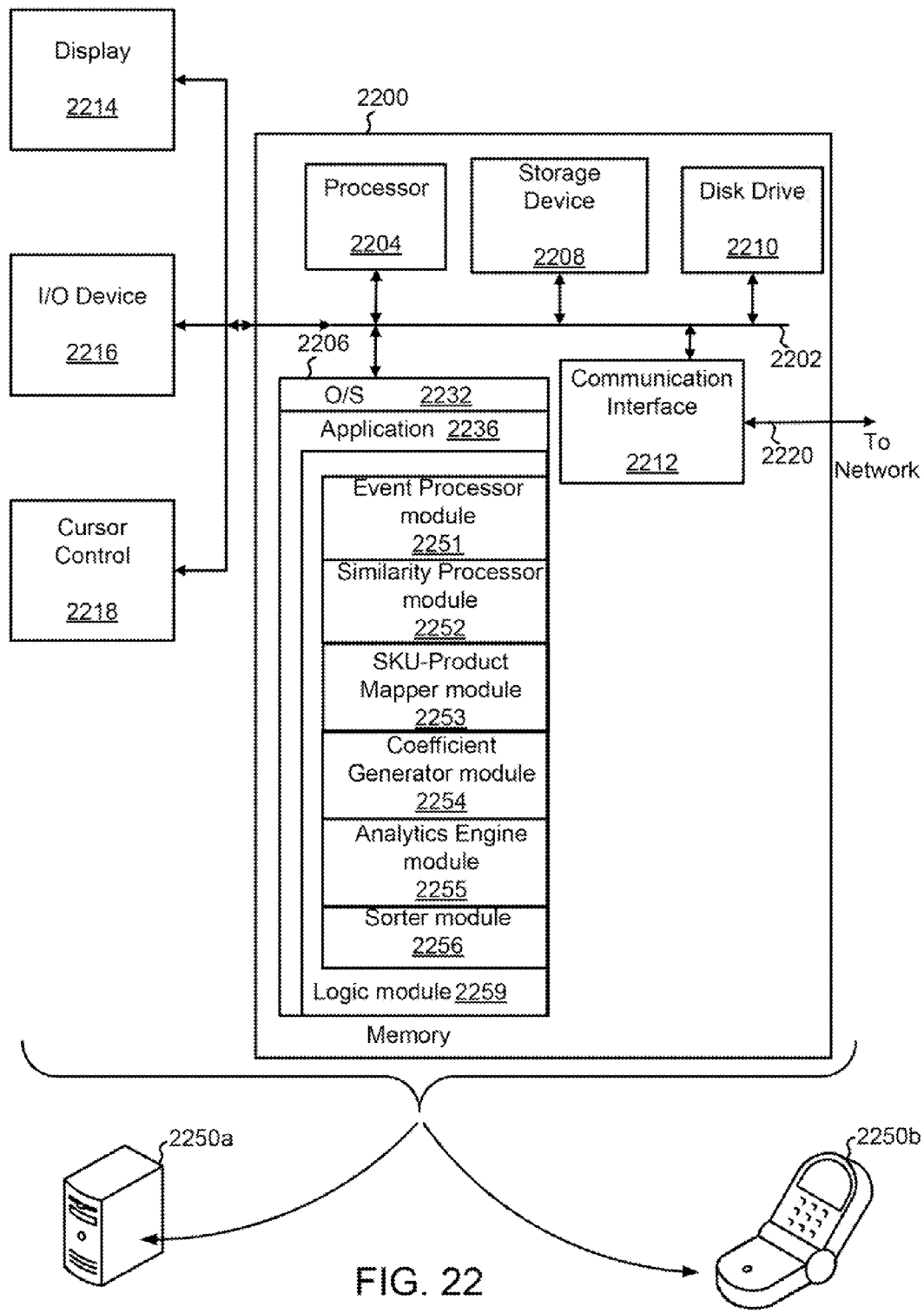
FIG. 22 illustrates an exemplary computer system suitable for implementing the functions described herein, according to at least one embodiment of the invention.

FIG. 22 illustrates an exemplary computer system suitable for implementing the functions described herein, according to at least one embodiment of the invention. In some examples, computer system 2200 can be used to implement computer programs, applications, methods, processes, or other software to perform the above-described techniques and to realize the structures described herein. Computer system 2200 can be implemented as a mobile device 2250b or as a server 2250a, or a combination thereof. Computer system 2200 includes a bus 2202 or other communication mechanism for communicating information, which interconnects subsystems and devices, such as a processor 2204, a system memory ("memory") 2206, a storage device 2208 (e.g., ROM), a disk drive 2210 (e.g., magnetic or optical), a communication interface 2212 (e.g., modem or Ethernet card), a display 2214 (e.g., a touchscreen, a CRT or a LCD), an input device 2216 (e.g., keyboard, controls to detect interactions with a touchscreen), and a pointer cursor control 2218 (e.g., mouse or trackball). According to some examples, computer system 2200 performs specific operations in which processor 2204 executes one or more sequences of one or more instructions stored in system memory 2206. Such instructions can be read into system memory 2206 from another computer readable medium, such as static storage device 2208 or disk drive 2210. In some examples, hard-wired circuitry can be used in place of or in combination with software instructions for implementation. In the example shown, system memory 2206 includes modules of executable instructions for implementing an operation system ("O/S") 2232, and an application 2236, which can be host, server, or web services-based, as well as distributed (i.e., enterprise). In some embodiments, application 2236 can implement logic module 2259, which includes an event processor module 2251 and a similarity processor module 2252, the functions of which are described herein. According to various embodiments, memory 2206 also can include a SKU-Product mapper Module 253, a coefficient generator module 2254, an analytics engine module 2255, and/or a sorter module 2256.

The term "computer readable medium" refers, at least in one embodiment, to any medium that participates in providing instructions to processor 2204 for execution. Such a medium can take many forms, including but not limited to, non-volatile media, volatile media, and transmission media. Non-volatile media includes, for example, optical or magnetic disks, such as disk drive 2210. Volatile media includes dynamic memory, such as system memory 2206. Transmission media includes coaxial cables, copper wire, and fiber optics, including wires that comprise bus 2202. Transmission media can also take the form of acoustic or light waves, such as those generated during radio wave and infrared data communications.

In at least some of the embodiments of the invention, the structures and/or functions of any of the above-described interfaces and panels can be implemented in software, hardware, firmware, circuitry, or a combination thereof. Note that the structures and constituent elements shown throughout, as well as their functionality, can be aggregated with one or more other structures or elements.

Alternatively, the elements and their functionality can be subdivided into constituent sub-elements, if any. As software, the above-described described techniques can be implemented using various types of programming or formatting languages, frameworks, syntax, applications, protocols, objects, or techniques, including C, Objective C, C++, C#, Flex™, Fireworks®, Java™, Javascript™, AJAX, COBOL, Fortran, ADA, XML, HTML, DHTML, XHTML, HTTP, XMPP, and others. These can be varied and are not limited to the examples or descriptions provided.

In at least some of the embodiments of the invention, one or more of the structures and/or functions of any of the above-described features can be implemented in software, hardware, firmware, circuitry, or a combination thereof. Note that the structures and constituent elements above, as well as their functionality, can be aggregated with one or more other structures or elements. Alternatively, the elements and their functionality can be subdivided into constituent sub-elements, if any.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment can readily be interchanged with other embodiments.

Thus, the foregoing descriptions of specific embodiments of the invention are presented for purposes of illustration and description. They are not intended to be exhaustive or to limit the invention to the precise forms disclosed; many alternatives, modifications, equivalents, and variations are possible in view of the above teachings. For the purpose of clarity, technical material that is known in the technical fields related to the embodiments has not been described in detail to avoid unnecessarily obscuring the description. Thus, the various embodiments can be modified within the scope and equivalents of the appended claims. Further, the embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the present invention; rather any specific embodiment can provide one or more of the advantages discussed above. In the claims, elements and/or operations do not imply any particular order of operation, unless explicitly stated in the claims. It is intended that the following claims and their equivalents define the scope of the invention.

The invention claimed is:

1. A method for facilitating discovery of data representing items, the method comprising:
   receiving data representing a selection request to transmit data to specify data representing subsets of item representations and to specify data representing relationships of the item representations to a principal item representation responsive to selection of a selected item representation;
   executing instructions at a processor to determine the relationships of the item representations to the selected item representation as the principal item representation;
   associating the item representations to positions of a data arrangement based on the relationships of the item representations, the data arrangement including:
      subsets of portions of the data arrangement, a subset of the portions of the data arrangement being associated with an attribute, the data arrangement further including:
         an intersection portion of the data arrangement at which at least two of the subsets of the portions intersect, and
         an interstitial portion of the data arrangement disposed between the intersection portion and another intersection portion of the data arrangement;
   forming data representing a selectable item representation associated with the intersection portion of the data arrangement; and
   causing transmission of data representing the data arrangement including data representing the item representations to be presented on an interface of a computing device, at least a portion of the data representing the item representations includes the data representing the selectable item representation.

2. The method of claim 1 wherein each of the subsets of item representations comprise:
   an association to a corresponding record having attributes of the items; and
   a variable attribute within the attributes of the items that is configured to vary over a subset of item representations.

3. The method of claim 2 wherein the variable attribute is associated with one subset of item representations, the one subset of item representations to be presented in the interface.

4. The method of claim 1 wherein executing the instructions to determine the relationships of the item representations to the principal item representation comprises:
   determining similarity values for the item representations relative to the principal item representation,
   wherein a similarity value for the selectable item representation associated with the intersection portion of the data arrangement is based on other attributes associated with other subsets of portions of the data arrangement.

5. The method of claim 1 further comprising:
   determining a first set of the similarity values to identify a first set of the item representations as perceptible items; and determining a second set of the similarity values to identify a second set of the item representations as imperceptible items.

6. The method of claim 5 further comprising:
associating data representing the perceptible items with a group of the portions of the data arrangements to be presented in the interface.

7. The method of claim 5 wherein determining the first set of the similarity values comprises:
identifying a first group of the item representations to be associated with the intersection portions, the first group of the item representations including the selectable item representation; and
identifying a second group of the item representations to be associated with the interstitial portions.

8. The method of claim 7 wherein identifying the first group of the item representations to be associated with the intersection portions comprises:
calculating similarity values for item representations to be associated with the intersection portions based on attributes other than associated with the subsets of item representation that intersection each other; and
calculating similarity values for item representations to be associated with the interstitial portions based on attributes other than associated with the subset of item representation to which an item representation belongs.

9. The method of claim 5 wherein determining the first set of the similarity values comprises:
determining a similarity value is a function of a distance of one or more attributes between a sample record for one of the item representations and a hero record for the principal item representation.

10. The method of claim 1 wherein receiving data representing the request to transmit data comprises:
receiving data representing a selection an item representation at a computing device as the principle item representation.

11. The method of claim 1 wherein executing the instructions to determine the relationships of the item representations to the principal item representation comprises:
determining similarity values for the item representations relative to the principal item representation based on a superset of attributes including secondary attributes that are not configured to vary over the subsets of item representations.

12. The method of claim 1 wherein executing the instructions to determine the relationships of the item representations to the principal item representation comprises:
determining similarity values; and
weighting the similarity values by a factor to either dampen or amplify the influence of a corresponding one of the similarity values.

13. The method of claim 12 wherein weighting the similarity values comprises:
generating a coefficients for attribute similarity values; and
tuning the value of the coefficients responsive to a signal from an analytics engine.

14. The method of claim 1 further comprising:
mapping positions of data in a hierarchical data arrangement to the positions of a data arrangement.

15. The method of claim 14 further comprising:
generating attribute sets.

16. The method of claim 14 further comprising:
extracting data from a first hierarchical data arrangement for stock-keeping unit ("SKU") data and a second hierarchical data arrangement for product data;
extracting the attributes from the SKU data and the product data to form extracted attributes; and
generating the records as units of data that include the extracted attributes.

17. A system for facilitating discovery of data representing items, the apparatus comprising:
logic configured to receive data representing a selection request to transmit data to specify data representing subsets of item representations and to specify data representing relationships of the item representations to a principal item representation responsive to selection of a selected item representation;
logic configured to execute instructions at a processor to determine the relationships of the item representations to the selected item representation as the principal item representation;
logic configured to associate the item representations to positions of a data arrangement based on the relationships of the item representations, the data arrangement including subsets of portions of the data arrangement, a subset of the portions of the data arrangement being associated with an attribute, the data arrangement further including:
an intersection portion of the data arrangement at which at least two of the subsets of the portions intersect, and
an interstitial portion of the data arrangement disposed between the intersection portion and another intersection portion of the data arrangement;
logic configured to form data representing a selectable item representation associated with the intersection portion of the data arrangement; and
logic configured to transmit data representing the data arrangement including data representing the item representations to be presented on an interface of a computing device, at least a portion of the data representing the item representations includes the data representing the selectable item representation, wherein the logic includes one or more processors coupled to a memory for executing instructions to implement one or more portions of the logic.

18. The system of claim 17 further comprising:
an attribute similarity determinator configured to determine similarity between individual attributes shared by a hero item record ("HR") for the principal item representation and a sample record ("SR") for one of the principal item representations.

19. The system of claim 17 further comprising:
a record similarity determinator configured to calculate the similarity between an attribute of a hero item record ("HR") and a sample record ("SR") by calculating a distance between the attribute values of HR and SR.

20. The system of claim 17 further comprising:
a similarity processor configured to:
generate similarity values for each record in a set;
sort the similarity values for each record from most similar to least similar; and
remove duplicate records with identical similarity values.

21. The system of claim 17 further comprising:
a coefficient generator configured to:
determine similarity values; and
apply a weighting to the similarity values to either dampen or amplify the influence of a corresponding one of the similarity values.

22. The system of claim 21 wherein the coefficient generator is further configured to:
generate coefficients for attribute similarity values; and tune the value of the coefficients to adjust the amount of dampening or amplifying.

23. The system of claim 17 further comprising:
a mapper module configured to:
map positions of data in a hierarchical data arrangement to the positions of a data arrangement.

24. The method of claim 23 wherein the mapper module is further configured to:
extract data from a first hierarchical data arrangement including a first subset of attribute data and a second hierarchical data arrangement including a second subset of attribute data;
extract the attributes from the first subset and the second subset of attribute data to form extracted attributes; and
generate the records as units of data that include the extracted attributes.

* * * * *